(12) United States Patent
Inghelbrecht et al.

(10) Patent No.: US 8,219,464 B2
(45) Date of Patent: *Jul. 10, 2012

(54) SYSTEM AND METHOD FOR SALES GENERATION IN CONJUNCTION WITH A VEHICLE DATA SYSTEM

(75) Inventors: Philip Inghelbrecht, Venice, CA (US); Scott Painter, Bel Air, CA (US)

(73) Assignee: TrueCar, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/080,832

(22) Filed: Apr. 6, 2011

(65) Prior Publication Data

US 2011/0191264 A1    Aug. 4, 2011

Related U.S. Application Data

(63) Continuation of application No. 12/556,137, filed on Sep. 9, 2009, now Pat. No. 7,945,483.

(60) Provisional application No. 61/095,550, filed on Sep. 9, 2008, provisional application No. 61/095,376, filed on Sep. 9, 2008.

(51) Int. Cl.
*G06Q 30/00* (2012.01)
*G06F 17/30* (2006.01)

(52) U.S. Cl. .............. 705/27.1; 705/27.2; 705/26.2; 705/26.5; 705/26.64

(58) Field of Classification Search ......... 705/26.1–27.2
See application file for complete search history.

(56) References Cited

U.S. PATENT DOCUMENTS

| | | | |
|---|---|---|---|
| 6,282,517 B1 | 8/2001 | Wolfe et al. |
| 6,609,108 B1 | 8/2003 | Pulliam et al. |
| 6,892,185 B1 | 5/2005 | Van Etten et al. |
| 7,133,835 B1 | 11/2006 | Fusz et al. |
| 7,546,243 B2 | 6/2009 | Kapadia et al. |
| 7,596,501 B2 | 9/2009 | Tivey et al. |
| 7,596,512 B1 | 9/2009 | Raines et al. |
| 7,599,842 B2 | 10/2009 | Tivey et al. |
| 7,747,474 B2 | 6/2010 | Miloslavsky et al. |

(Continued)

FOREIGN PATENT DOCUMENTS

EP    1326176    9/2003

(Continued)

OTHER PUBLICATIONS

"CarPrices.com, Selectica and JATO Dynamics Enter Agreement to Deliver Online Car Configuration Package." Business Wire. Dec. 13, 1999. [recovered from Dialog on Feb. 2, 2012].*

(Continued)

*Primary Examiner* — Will Allen
*Assistant Examiner* — Kathleen G Palavecino
(74) *Attorney, Agent, or Firm* — Sprinkle IP Law Group

(57) ABSTRACT

Embodiments of sales generation, including sales generation employing reverse lead generation using vehicle data systems and methods, are presented herein. In particular, in certain embodiments a user may utilize the vehicle data system to obtain pricing data corresponding to a desired vehicle configuration. When the user is presented with the pricing data associated with the specified vehicle configuration the user may additionally be presented with an upfront price offered by a dealer, where by providing their personal information the user may obtain the name of the dealer offering the upfront price and may additionally be offered the opportunity to purchase the desired, or similar, vehicle at the upfront price.

22 Claims, 25 Drawing Sheets

U.S. PATENT DOCUMENTS

| | | | |
|---|---|---|---|
| 7,801,798 | B1 | 9/2010 | Huemer et al. |
| 7,818,201 | B2 | 10/2010 | Shevlin et al. |
| 7,945,483 | B2 | 5/2011 | Inghelbrecht et al. |
| 8,000,989 | B1 | 8/2011 | Kiefhaber et al. |
| 8,078,515 | B2 | 12/2011 | John |
| 2001/0037205 | A1 | 11/2001 | Joao |
| 2002/0007331 | A1 | 1/2002 | Lo et al. |
| 2002/0111856 | A1 | 8/2002 | Messer et al. |
| 2002/0116348 | A1 | 8/2002 | Phillips et al. |
| 2002/0147625 | A1 | 10/2002 | Kolke, Jr. |
| 2002/0194051 | A1 | 12/2002 | Hall et al. |
| 2003/0065532 | A1 | 4/2003 | Takaoka |
| 2003/0083961 | A1 | 5/2003 | Bezos et al. |
| 2003/0105728 | A1 | 6/2003 | Yano et al. |
| 2003/0200151 | A1 | 10/2003 | Ellenson et al. |
| 2003/0229577 | A1 | 12/2003 | Nabel |
| 2004/0014454 | A1 | 1/2004 | Burgess et al. |
| 2004/0019516 | A1 | 1/2004 | Puskorius et al. |
| 2004/0093284 | A1 | 5/2004 | Takaoka et al. |
| 2004/0128224 | A1 | 7/2004 | Dabney et al. |
| 2004/0143473 | A1 | 7/2004 | Tivey et al. |
| 2004/0143476 | A1 | 7/2004 | Kapadia et al. |
| 2004/0143482 | A1 | 7/2004 | Tivey et al. |
| 2004/0210485 | A1 | 10/2004 | Luo et al. |
| 2005/0071249 | A1 | 3/2005 | Nix et al. |
| 2005/0108112 | A1 | 5/2005 | Ellenson et al. |
| 2005/0125308 | A1 | 6/2005 | Puentes et al. |
| 2005/0144061 | A1 | 6/2005 | Rarity et al. |
| 2005/0171859 | A1 | 8/2005 | Harrington et al. |
| 2005/0209934 | A1 | 9/2005 | Irby et al. |
| 2005/0256780 | A1 | 11/2005 | Eldred |
| 2005/0261951 | A1 | 11/2005 | Tighe |
| 2005/0267774 | A1 | 12/2005 | Merritt et al. |
| 2006/0080210 | A1 | 4/2006 | Mourad et al. |
| 2006/0085209 | A1 | 4/2006 | Walker, III |
| 2006/0085283 | A1 | 4/2006 | Griffiths |
| 2006/0106668 | A1 | 5/2006 | Kim et al. |
| 2006/0129423 | A1* | 6/2006 | Sheinson et al. .................. 705/1 |
| 2006/0212355 | A1 | 9/2006 | Teague et al. |
| 2007/0005446 | A1 | 1/2007 | Fusz et al. |
| 2007/0038522 | A1 | 2/2007 | Bell et al. |
| 2007/0112582 | A1 | 5/2007 | Fenlon |
| 2007/0219851 | A1 | 9/2007 | Taddei et al. |
| 2007/0244797 | A1 | 10/2007 | Hinson et al. |
| 2007/0250327 | A1 | 10/2007 | Hedy |
| 2008/0177590 | A1 | 7/2008 | Brodsky et al. |
| 2008/0189156 | A1 | 8/2008 | Voda et al. |
| 2008/0201163 | A1 | 8/2008 | Barker et al. |
| 2008/0201203 | A1 | 8/2008 | Rose et al. |
| 2008/0288361 | A1 | 11/2008 | Rego et al. |
| 2008/0300962 | A1 | 12/2008 | Cawston et al. |
| 2009/0006118 | A1 | 1/2009 | Pollak |
| 2009/0037356 | A1 | 2/2009 | Rothstein et al. |
| 2009/0048859 | A1 | 2/2009 | McCarthy et al. |
| 2009/0171761 | A1 | 7/2009 | Noy et al. |
| 2009/0187513 | A1 | 7/2009 | Noy et al. |

FOREIGN PATENT DOCUMENTS

| | | | |
|---|---|---|---|
| WO | WO 0140898 | A2 | 6/2001 |
| WO | WO 0140898 | A3 | 11/2007 |

OTHER PUBLICATIONS

International Search Report and Written Opinion for PCT Application No. PCT/US2009/056316, completed Oct. 15, 2009, mailed Oct. 26, 2009, 7 pgs.

International Search Report and Written Opinion for PCT Application No. PCT/US2009/056315, completed Oct. 12, 2009, mailed Oct. 20, 2009, 7 pgs.

International Search Report and Written Opinion for PCT Application No. PCT/US2009/056317, completed, Oct. 22, 2009, mailed Dec. 10, 2009, 8 pgs.

Office Action for U.S. Appl. No. 12/556,137, mailed on Sep. 1, 2010, 14 pgs.

cars.com, http://cars.com/ Internet Archive (Jul. 18, 2007)—http://web.archive.org/web/20070718071752/www.car.com/.

Office Action for U.S. Appl. No. 12/556,137, mailed on Dec. 30, 2010, 15 pgs.

edmunds.com http://www.edmunds.com/Internet Archive (Jan. 18, 2010)—http://web.archive.org/web/20080118210310/http://www.edmunds.com/ printed Dec. 15, 2010, 3 pgs.

Notice of Allowance issued in U.S. Appl. No. 12/556,137, mailed Feb. 10, 2011, 12 pgs.

Office Action issued for U.S. Appl. No. 12/556,076 mailed Dec. 27, 2011, 13 pages.

Office Action issued for U.S. Appl. No. 12/556,109 mailed Jan. 24, 2012, 16 pgs.

2nd Written Opinion issued for PCT Application No. PCT/US09/56317, mailed Dec. 6, 2011, 6 pages.

Office Action issued for U.S. Appl. No. 12/556,076, mailed Mar. 26, 2012, 14 pages.

Office Action issued for U.S. Appl. No. 12/556,109, mailed Mar. 26, 2012, 15 pages.

Goldberg, "Job Security through PPC-CEM Integration", paydigest.com, published Aug. 22, 2007.

Sauberlich, et al. "Analytical Lead Management in the Automotive Industry," Springerlink Heidelberg Springer Berlin 2006, pp. 290-299, 10 pages.

Office Action issued for U.S. Appl. No. 11/968,137, mailed Dec. 23, 2010, 8 pages.

Office Action issued for U.S. Appl. No. 11/968,137, mailed Jun. 9, 2011, 9 pages.

Office Action issued for U.S. Appl. No. 11/968,137, mailed Dec. 19, 2011, 10 pages.

Gregory M. Collins, "Technology Opens Up Huge CRM Opportunities for Retailers," Jun. 10, 2002. Retrieved from http://www.destinationcrm.com/Articles/PrintArticle.aspx?ArticleID=47419.

Rick Gibbs, "How Google Base Replaces Autos Classifieds", Nov. 27, 2006. Retrieved from http://www.imediaconnection.com/printpage.aspx?id=12548.

No Author, "3 Reasons Why Using Google Pays Off for Automobile Dealers," 2005 Retrieved from http://www.kaistudios.com/PPC/guides/Google-autodealers.htm.

Office Action issued for U.S. Appl. No. 12/179,164, mailed Sep. 30, 2009, 19 pages.

Office Action issued for U.S. Appl. No. 12/179,164, mailed Apr. 8, 2010, 20 pages.

"Innovative Website Moves Consumer Purchases Online," Business Wire, New York, Jul. 18, 2006.

Office Action issued for U.S. Appl. No. 12/179,164, mailed Oct. 27, 2010, 20 pages.

Office Action issued for U.S. Appl. No. 12/179,164, mailed Feb. 15, 2011, 20 pages.

Office Action issued for U.S. Appl. No. 12/179,164, mailed Sep. 2, 2011, 21 pages.

International Preliminary Report on Patentability (IPRP) issued for PCT Patent Application No. PCT/US2009/056316, mailed May 1, 2012, 6 pages.

Extended European Search Report issued for European Patent Application No. 09 813 513.0, mailed Feb. 21, 2012, 8 pages.

Extended European Search Report issued for European Patent Application No. 09 813 514.8, mailed Apr. 25, 2012, 5 pages.

International Preliminary Report on Patentability (IPRP) issued for PCT Patent Application No. PCT/US2009/056315, mailed May 16, 2012, 7 pages.

* cited by examiner

FIG. 4B

What's Next - 3 Easy Steps  🖨 Print Price Protection Certificate and TrueCar Report

1 Print your Price Certificate
Print this page.

2 Contact your dealer
Contact your dealer representative to choose your car from inventory and arrange a test drive.

3 Buy your car
Take your Price Certificate and TrueCar Price Report to the dealership and pick up your vehicle – you're never obligated to make a purchase.

Remember: Your Certified Dealer will do their best to match the car you built to what is available for purchase. If you decide on a different model or trim level, your dealer can look up your no-haggle low price on any vehicle you choose.

YOUR DEALER(S) AND VEHICLE(S)

LOW PRICE GUARANTEE CERTIFIED DEALER

Universal City Nissan
YOUR REPRESENTATIVE(S): Victoria Atkinson
TELEPHONE: (847) 647-1555
EMAIL: victoria_atkinson@sbcglobal.net
ADDRESS: 5757 W. Touhy
Niles, IL 60714

BONUS - DEALER PERKS: Free Local Delivery, Express Checkout Available!

DISTANCE FROM YOU – 13.6 Miles  Map It

VIEW REPORT

YOUR GUARANTEED PRICE:
$752 above invoice including incentives!
Your price: $19,600 with the options you chose
TrueCar Avg Paid: $19,876 with the options you chose

YOUR REQUESTED VEHICLE

2009 Nissan Frontier 2WD Crew Cab SWB Auto SE

| Color | Exterior: Red Alert |
| | Interior: Beige |
| Options | None Selected |
| Incentives | $3,000 Customer Incentive Expires on 08/31/09 |

MSRP as configured: $24,060
Invoice as configured: $18,848
TrueCar Average Paid: $19,876

TRUECAR™ AVERAGE PRICE: $19,876
Based on the last 322 vehicles purchased

[TC]  Find Out What Others Really Paid ▲

*FIG. 12B*

SYSTEM AND METHOD FOR SALES GENERATION IN CONJUNCTION WITH A VEHICLE DATA SYSTEM

RELATED APPLICATIONS

This application is a continuation of, and claims a benefit of priority under 35 U.S.C. 120 of the filing date of U.S. patent application Ser. No. 12/556,137 filed Sep. 9, 2009, entitled "SYSTEM AND METHOD FOR SALES GENERATION IN CONJUNCTION WITH A VEHICLE DATA SYSTEM" by Inghelbrecht et al., which in turn claims the benefit of priority under 35 U.S.C. §119 to U.S. Provisional Patent Application No. 61/095,550 filed, Sep. 9, 2008, entitled "SYSTEM AND METHOD FOR AGGREGATION, ANALYSIS, AND MONETIZATION OF PRICING DISTRIBUTION DATA FOR VEHICLES AND OTHER COMMODITIES" by Taira et al and U.S. Provisional Patent Application No. 61/095,376 filed, Sep. 9, 2008, entitled "SYSTEM AND METHOD FOR CALCULATING AND DISPLAYING COMPLEX PRODUCT PRICE DISTRIBUTIONS BASED ON AGGREGATION AND ANALYSIS OF INDIVIDUAL TRANSACTIONS" by Taira et al., which are hereby fully incorporated by reference herein for all purposes.

TECHNICAL FIELD

The present disclosure relates generally to sales generation. More particularly, the present disclosure relates to sales generation in conjunction with the presentation of pricing data for a commodity.

BACKGROUND

Consumers are at a serious negotiation disadvantage when they do not have information relevant to a specifically desired product or do not understand such information. Exacerbating this problem is the fact that complex, negotiated transactions can be difficult for consumers to understand due to a variety of factors, including interdependence between local demand and availability of products or product features, the point-in-time in the product lifecycle at which a transaction occurs, and the interrelationships of various transactions to one another. For example, a seller may sacrifice margin on one aspect of one transaction and recoup that margin from another transaction with the same (or a different) customer. Furthermore, currently available data for complex transactions is single dimensional. To illustrate with a specific example, a recommended price (e.g. $1,000) may not take into account how sensitive that price is (is $990 a good or bad price)? Recommended prices also become decreasingly accurate as the product, location, and availability of a particular product is defined with greater specificity. Additionally, dealers may use different pricing for the same product sold to different people, and as such do not publish this pricing to consumers.

These circumstances can be seen in a variety of contexts. In particular, the automotive transaction process may entail complexity of this type. This complexity is reflected in the lead generation tactics utilized in conjunction with the automotive transaction process, and in particular in the context of online automotive transactions. Traditionally, lead generation in the context of online automotive retail has been the primary way for dealers to find buyers for their vehicles. Lead generation is built around the premise that a consumer will give their personal details, which will be provided to dealers who will, in turn, provide a price for a desired vehicles. This model for lead generation has resulted in disappointment for both constituencies: dealers are reluctant to provide an upfront price to consumers as dealers prefer to have potential buyers visit the showroom instead and retain the ability to optimize their profit margin by charging different prices for the same vehicle depending on the buyer; conversely, dealers get low conversion on leads because they are typically harvested in duplicate or from web sites which have no in-market traffic.

There are therefore a number of unmet desires when it comes to sales generation in the context of vehicle sales.

SUMMARY

Embodiments of sales generation using vehicle data systems and methods presented herein. In particular, embodiments of the present invention may include reverse lead generation whereby a vehicle data system may have one or more dealer prices where the dealer prices are associated with a particular vehicle or vehicle configuration. A user may utilize the vehicle data system to obtain pricing data corresponding to a desired vehicle configuration. When the user is presented with the pricing data associated with the specified vehicle configuration the user may additionally be presented with an upfront price offered by a dealer, where by providing their personal information the user may obtain the name of the dealer offering the upfront price and may additionally be offered the opportunity to purchase the desired vehicle at the upfront price. As can be seen then in some embodiments, sales generation may be driven by an auction model where only a particular dealer has his price listed. As such, and unlike traditional lead generation, leads remain high quality as they are not distributed across multiple dealers.

Specifically, embodiments of the vehicle data system may have access to historical transaction data which may be processed to determine desired pricing data associated with the desired vehicle configuration including a mean price, pricing distributions, price ranges, etc. associated with the desired vehicle configuration. The user can then be presented with a display which presents the desired pricing data along with a selected dealer's upfront pricing. By presenting the dealer pricing information in this context, the dealer prices are presented at a relevant time, when potential buyers are more likely to buy and at the end of the purchasing funnel (for example, once user's have specified their desired vehicle configuration to obtain pricing data) where price may be the only unknown for the user (in other words where the user may have decided on the desired vehicle configuration he wishes to purchase.

Furthermore, the dealer prices may be presented in a contextually appealing and overall reassuring manner by virtue of the fact that the dealer price is not presented in a vacuum but is instead presented in the context of a full overview of what others have recently paid for the same (or similar) vehicle in the local market. This type of sales generation is advantageous for dealers as they are presented with highly qualified leads only and advantageous to consumers as they may be presented with an upfront price provided before arriving at a dealer. The efficacy of such embodiments may be marked. In fact, while traditional lead generation may have an average cost per lead of around twenty dollars and the conversion of such leads may be less than 6% resulting in a cost per sale of around $300 it is estimated that using embodiments of the systems and methods presented herein the conversion on leads will be around 20% and the cost per sale may be less than $300.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIGS. 4A and 4B depict embodiments of interfaces for presenting upfront pricing information and dealer information.

FIGS. 12A-12D depict embodiments of interfaces for obtaining vehicle configuration information and the presentation of pricing data.

DETAILED DESCRIPTION

Figure 1:
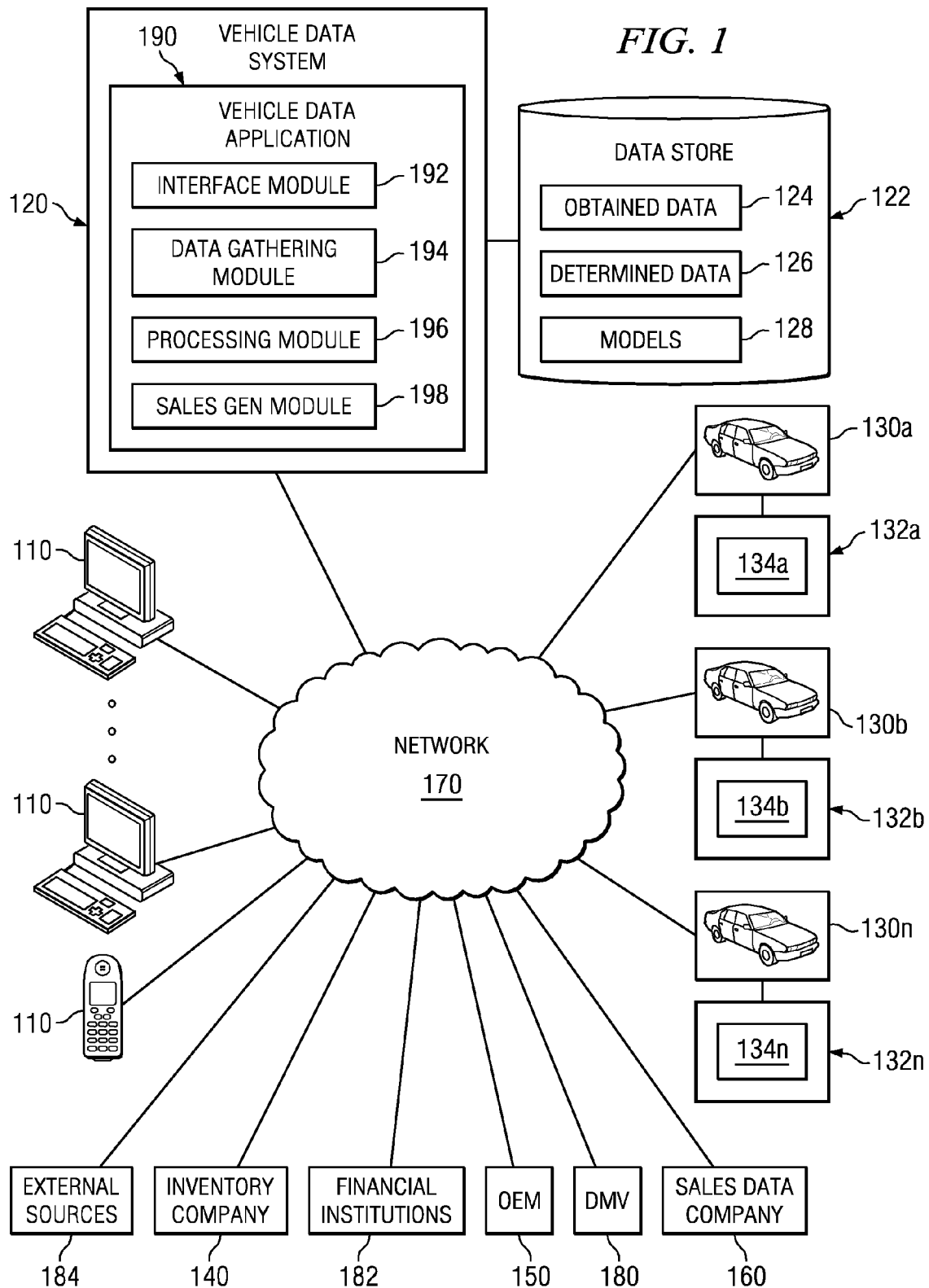
FIG. 1 depicts of one embodiment of a topology including a vehicle data system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a HD), hardware circuitry or the like, or any combination.

Before discussing specific embodiments, embodiments of a hardware architecture for implementing certain embodiments are described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.), or the like. In various embodiments, the computer has access to at least one database over the network.

ROM, RAM, and HD are computer memories for storing computer instructions executable (in other which can be directly executed or made executable by, for example, compilation, translation, etc.) by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

The invention and the various features and advantageous details thereof are explained more fully with reference to the nonlimiting embodiments that are illustrated in the accompanying drawings and detailed in the following description. These embodiments may be better understood with reference to U.S. patent application Ser. No. 12/556,076 entitled "SYSTEM AND METHOD FOR AGGREGATION, ANALYSIS, PRESENTATION AND MONETIZATION OF PRICING DATA FOR VEHICLES AND OTHER COMMODITIES" by Taira et al., filed on Sep. 9, 2009 and U.S. patent application Ser. No. 12/556,109 entitled "SYSTEM AND METHOD FOR CALCULATING AND DISPLAYING PRICE DISTRIBUTIONS BASED ON ANALYSIS OF TRANSACTIONS" by Taira et al., filed on Sep. 9, 2009, which are incorporated herein by reference in their entirety for all purposes. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. For example, though embodiments of the present invention have been presented using the example commodity of vehicles it should be understood that other embodiments may be equally effectively applied to other commodities.

As discussed above, the lead generation tactics utilized in conjunction with the automotive transaction process may be problematic. Traditionally, lead generation in the context of online automotive retail has been the primary way for dealers to find buyers for their vehicles. Lead generation is built around the premise that a consumer will give their personal details, which will be provided to dealers who will, in turn, provide a price for a desired vehicles. This model for lead generation is problematic for a variety of reasons: consumers usually do not want to supply their personal information, both for reasons of privacy concerns and the knowledge that by supplying this personal information they are inviting dealers to make annoying, uninvited solicitations of their business. Furthermore, as the conversion rate for these types of leads is low, dealers may be reluctant to pay a significant fee for such leads (as this fee may increase their overall marketing cost per vehicle sold). Accordingly, the providers of such leads typically use a "shotgun" approach whereby obtained leads (including consumer's personal information and which may include a desired vehicle configuration) are provided to multiple dealers. Dealers are also hesitant to provide upfront pricing information in a publicly accessible manner (for example, on a web site) as there may be a concern that by offering such a price to one consumer, they may be inadvertently offering the same price to all consumers. This may be the case as certain laws may require dealers to honor prices published to the public. This may be problematic to dealers as they may desire to keep profit margins high by retaining the ability to charge different prices for the same vehicle depending on their ability to negotiate with a particular consumer.

Accordingly, what dealers desire is a way to present upfront pricing information to consumers which are ready to make a purchase such that the conversion rate of the presentation of such data will be high. Consumers, on the other hand, desire to be presented with pricing data in a highly relevant context without necessarily having to provide any personalized information.

To accomplish these ends, among others, attention is now directed to embodiments of sales generation using vehicle data systems and methods presented herein. In particular, embodiments of the present invention may include reverse lead generation whereby a vehicle data system may have one or more dealer prices where the dealer prices are associated with a particular vehicle or vehicle configuration. A user may utilize the vehicle data system to obtain pricing data corresponding to a desired vehicle configuration. When the user is presented with the pricing data associated with the specified vehicle configuration the user may additionally be presented with an upfront price offered by a dealer, where by providing their personal information the user may obtain the name of the dealer offering the upfront price and may additionally be offered the opportunity to purchase the desired vehicle (or a vehicle with a configuration similar to the desired vehicle) at the upfront price (for example, when the user visits the dealer). As can be seen then in some embodiments, sales generation may be driven by an auction model where only a particular dealer or set of dealers (which may be the dealer, or dealers, offering the lowest dealer price, offering to pay the highest amount for a lead or to have their upfront price displayed, having the highest quality score, which currently has the desired or a similar vehicle in stock, or some combination of factors listed or other factors) has his price listed. As such, and unlike traditional lead generation, leads remain high quality as they are not distributed across multiple dealers.

Specifically, embodiments of the vehicle data system may have access to historical transaction data which may be processed to determine desired pricing data associated with the desired vehicle configuration including a mean price, pricing distributions, price ranges, etc. associated with the desired vehicle configuration. The user can then be presented with a display which presents the desired pricing data along with a selected dealer's upfront pricing. By presenting the dealer pricing information in this context, the dealer prices are presented at a relevant time, when potential buyers are more likely to buy and at the end of the purchasing funnel (for example, once user's have specified their desired vehicle configuration to obtain pricing data) where price may be the only unknown for the user (in other words where the user may have decided on the desired vehicle configuration he wishes to purchase.

Furthermore, the dealer prices may be presented in a contextually appealing and overall reassuring manner by virtue of the fact that the dealer price is not presented in a vacuum but is instead presented in the context of a full overview of what others have recently paid for the same (or similar) vehicle in the local market. This type of sales generation is advantageous for dealers as they are presented with highly qualified leads only and advantageous to consumers as they may be presented with an upfront price provided before arriving at a dealer.

The same, or similar, historical transaction data which is obtained from dealers and utilized by the system to determine pricing data for vehicles configurations may additionally be utilized to determine if dealers who have offered upfront pricing to users actually sold a vehicle to any of those users. If such a sale has occurred, the relationship of the actual price at which the vehicle was sold to the user to the upfront pricing offered by the vehicle data system to the user in conjunction with that dealer and vehicle may be determined. The relationship of the upfront price offered and the actual price at which the vehicle was sold may be used to determine or adjust a dealer's quality rating, and the quality rating of the various dealers may, in turn, factor into the decision of which upfront price is presented to a user by the vehicle data system.

The data obtained by the vehicle data system from the dealer may also comprise inventory data corresponding to the dealer, in other words, what vehicle configurations the dealer currently has in stock. As the desired configuration of a vehicle (not only make and model, but additionally, for example, color, powertrain, number of doors, etc.) may be important to a user it may be desirable to present a price from a dealer who currently has the desired vehicle configuration, or a vehicle configuration which is similar in certain attributes to the desired vehicle configuration, to a user. Thus, a dealer's inventory, including the similarity of vehicle(s) in a dealer's current inventory to a user's desired vehicle configuration, may be utilized (either alone or in addition to a dealer's quality score and other factors) to determine which dealer's upfront price to present to a user.

As noted, since in many cases a dealer may not have a vehicle of the user's exact desired configuration in certain embodiments, instead of providing an upfront price corresponding to each possible vehicle configuration a dealer may provide an invoice offset which may, for example, be associated with that dealer and with a particular vehicle make, a particular vehicle vehicle make and model, a vehicle make model and trim, etc. Thus, leveraging the fact that the vehicle data system may have access to invoice pricing data an upfront price for a dealer may be calculated by determining an invoice price for the user's desired configuration and adding (or subtracting) the dealers invoice offset from the determined invoice price to determine an upfront price for the specified vehicle configuration associated with that dealer. It will be noted that, as discussed above, the dealer price (or invoice offset) for each dealer may be used (either alone in combination with, inventory data, quality ratings or other factors) to determine which dealer's upfront price to present to a user.

Embodiments of the systems and methods of the present invention may be better explained with reference to FIG. 1 which depicts one embodiment of a topology which may be used to implement embodiments of the systems and methods of the present invention. Topology 100 comprises a set of entities including vehicle data system 120 (also referred to herein as the TrueCar system) which is coupled through network 170 to computing devices 110 (e.g. computer systems, personal data assistants, kiosks, dedicated terminals, mobile telephones, smart phones, etc,), and one or more computing devices at inventory companies 140, original equipment manufacturers (OEM) 150, sales data companies 160, financial institutions 182, external information sources 184, departments of motor vehicles (DMV) 180 and one or more associated point of sale locations, in this embodiment, car dealers 130. Network 170 may be for example, a wireless or wireline communication network such as the Internet or wide area network (WAN), publicly switched telephone network (PTSN) or any other type of electronic or non-electronic communication link such as mail, courier services or the like.

Vehicle data system 120 may comprise one or more computer systems with central processing units executing instructions embodied on one or more computer readable media where the instructions are configured to perform at least some of the functionality associated with embodiments of the present invention. These applications may include a vehicle data application 190 comprising one or more applications (instructions embodied on a computer readable media) configured to implement an interface module 192, data gathering module 194, processing module 196 and sales generation module 198 utilized by the vehicle data system 120. Furthermore, vehicle data system 120 may include data store 122 operable to store obtained data 124 such as dealer information, dealer inventory and dealer upfront pricing; data 126 determined during operation, such as a quality score for a dealer; models 128 which may comprise a set of dealer cost model or price ratio models; or any other type of data associated with embodiments of the present invention or determined during the implementation of those embodiments.

More specifically, in one embodiment, data stored in data store 122 may include a set of dealers with corresponding dealer information such as the name and location of a dealer, makes sold by the dealer, etc. Each of the set of dealers may be associated with a list of one or more vehicle configurations and associated upfront prices, where the upfront price associated with a vehicle configuration is associated with the lowest price that the dealer is willing to offer to a user for that vehicle configuration. Data in data store 122 may also include an inventory list associated with each of the set of dealers which comprises the vehicle configurations currently in stock at each of the dealers. A quality score may also be associated with each of the set of dealers in data store 122.

Vehicle data system 120 may provide a wide degree of functionality including utilizing one or more interfaces 192 configured to for example, receive and respond to queries from users at computing devices 110; interface with inventory companies 140, manufacturers 150, sales data companies 160, financial institutions 170, DMVs 180 or dealers 130 to obtain data; or provide data obtained, or determined, by vehicle data system 120 to any of inventory companies 140, manufacturers 150, sales data companies 160, financial institutions 182, DMVs 180, external data sources 184 or dealers 130. It will be understood that the particular interface 192 utilized in a given context may depend on the functionality being implemented by vehicle data system 120, the type of network 170 utilized to communicate with any particular entity, the type of data to be obtained or presented, the time interval at which data is obtained from the entities, the types of systems utilized at the various entities, etc. Thus, these interfaces may include, for example web pages, web services, a data entry or database application to which data can be entered or otherwise accessed by an operator, or almost any other type of interface which it is desired to utilize in a particular context.

In general, then, using these interfaces 192 vehicle data system 120 may obtain data from a variety of sources, including one or more of inventory companies 140, manufacturers 150, sales data companies 160, financial institutions 182, DMVs 180, external data sources 184 or dealers 130 and store such data in data store 122. This data may be then grouped, analyzed or otherwise processed by vehicle data system 120 to determine desired data 126 or models 128 which are also stored in data store 122. A user at computing device 110 may access the vehicle data system 120 through the provided interfaces 192 and specify certain parameters, such as a desired vehicle configuration. The vehicle data system 120 can select or generate data using the processing module 196 and may additionally generate upfront pricing information using sales generation module 198. Interfaces can be generated from the selected data set, the data determined from the processing and the upfront pricing information using interface module 192 and these interfaces presented to the user at the user's computing device 110. More specifically, in one embodiment interfaces 192 may visually present this data to the user in a highly intuitive and useful manner.

In particular, in one embodiment, a visual interface may present at least a portion of the selected data set as a price curve, bar chart, histogram, etc. that reflects quantifiable prices or price ranges (e.g. "average," "good," "great," "overpriced" etc.) relative to reference pricing data points (e.g., invoice price, MSRP, dealer cost, market average, internet average, etc.). The visual interface may also present the upfront pricing information in conjunction with the selected data set such that the upfront pricing information is presented in a relevant and contextual manner (in other words, the upfront pricing information for a specified vehicle configuration may be presented in the context of pricing data associated with that specific vehicle configuration).

Turning to the various other entities in topology 100, dealer 130 may be a retail outlet for vehicles manufactured by one or more of OEMs 150. To track or otherwise manage sales, finance, parts, service, inventory and back office administration needs dealers 130 may employ a dealer management system (DMS) 132. Since many DMS 132 are Active Server Pages (ASP) based, transaction data 134 may be obtained directly from the DMS 132 with a "key" (for example, an ID and Password with set permissions within the DMS system 132) that enables data to be retrieved from the DMS system 132. Many dealers 130 may also have one or more web sites which may be accessed over network 170, where pricing data pertinent to the dealer 130 may be presented on those web sites, including any pre-determined, or upfront, pricing. This price is typically the "no haggle" (price with no negotiation) price and may be deemed a "fair" price by vehicle data system 120.

Additionally, a dealer's current inventory may be obtained from a DMS 132 and associated with that dealer's information in data store 122. A dealer 130 may also provide one or more upfront prices to operators of vehicle data system 120 (either over network 170, in some other electronic format or in some non-electronic format). Each of these upfront prices may be associated with a vehicle configuration such that a list of vehicle configurations and associated upfront prices may be associated with a dealer in data store 122. As noted above, this upfront price may, in one embodiment, comprise an offset from an inventory price for the vehicle configuration. It will be noted that an upfront price may be provided at almost any level of granularity desired. For example, a single upfront price may correspond to all vehicles of a particular make sold by the dealer, to all vehicles of a particular make and model sold by the dealer, to all vehicles of a particular make, model and trim sold by the dealer, etc.

Inventory companies 140 may be one or more inventory polling companies, inventory management companies or listing aggregators which may obtain and store inventory data from one or more of dealers 130 (for example, obtaining such data from DMS 132). Inventory polling companies are typically commissioned by the dealer to pull data from a DMS 132 and format the data for use on websites and by other systems. Inventory management companies manually upload inventory information (photos, description, specifications) on behalf of the dealer. Listing aggregators get their data by "scraping" or "spidering" websites that display inventory content and receiving direct feeds from listing websites (for example, Autotrader, FordVehicles.com).

DMVs 180 may collectively include any type of government entity to which a user provides data related to a vehicle. For example, when a user purchases a vehicle it must be registered with the state (for example, DMV, Secretary of State, etc.) for tax and titling purposes. This data typically includes vehicle attributes (for example, model year, make, model, mileage, etc.) and sales transaction prices for tax purposes.

Financial institution 182 may be any entity such as a bank, savings and loan, credit union, etc. that provides any type of financial services to a participant involved in the purchase of a vehicle. For example, when a buyer purchases a vehicle they may utilize a loan from a financial institution, where the loan process usually requires two steps: applying for the loan and contracting the loan. These two steps may utilize vehicle and consumer information in order for the financial institution to properly assess and understand the risk profile of the loan. Typically, both the loan application and loan agreement include proposed and actual sales prices of the vehicle.

Sales data companies 160 may include any entities that collect any type of vehicle sales data. For example, syndicated sales data companies aggregate new and used sales transaction data from the DMS 132 systems of particular dealers 130. These companies may have formal agreements with dealers 130 that enable them to retrieve data from the dealer 130 in order to syndicate the collected data for the purposes of internal analysis or external purchase of the data by other data companies, dealers, and OEMs.

Manufacturers 150 are those entities which actually build the vehicles sold by dealers 130. In order to guide the pricing of their vehicles, the manufacturers 150 may provide an Invoice price and a Manufacturer's Suggested Retail Price (MSRP) for both vehicles and options for those vehicles—to be used as general guidelines for the dealer's cost and price. These fixed prices are set by the manufacturer and may vary slightly by geographic region.

External information sources 184 may comprise any number of other various source, online or otherwise, which may provide other types of desired data, for example data regarding vehicles, pricing, demographics, economic conditions, markets, locale(s), consumers, etc.

It should be noted here that not all of the various entities depicted in topology 100 are necessary, or even desired, in embodiments of the present invention, and that certain of the functionality described with respect to the entities depicted in topology 100 may be combined into a single entity or eliminated altogether. Additionally, in some embodiments other data sources not shown in topology 100 may be utilized. Topology 100 is therefore exemplary only and should in no way be taken as imposing any limitations on embodiments of the present invention.

Before delving into the details of various embodiments of the present invention it may be helpful to give a general overview of an embodiment the present invention with respect to the above described embodiment of a topology, again using the example commodity of vehicles. At certain intervals then, vehicle data system 120 may obtain by gathering data from one or more of inventory companies 140, manufacturers 150, sales data companies 160, financial institutions 182, DMVs 180, external data sources 184 or dealers 130. This data may include sales or other historical transaction data for a variety of vehicle configurations, inventory data, registration data, finance data, vehicle data, upfront prices from dealers, etc. (the various types of data obtained will be discussed in more detail later). This data may be processed to yield data sets corresponding to particular vehicle configurations.

At some point then, a user at a computing device may access vehicle data system 120 using one or more interface 192 such as a set of web pages provided by vehicle data system 120. Using this interface 192 a user may specify a vehicle configuration by defining values for a certain set of vehicle attributes (make, model, trim, power train, options, etc.) or other relevant information such as a geographical location. Information associated with the specified vehicle configuration may then be presented to the user through interface 192. This information may include pricing data corresponding to the specified vehicle and upfront pricing information, including an upfront price being offered to the user by a dealer for the specified vehicle.

In particular the pricing data and upfront pricing information may be determined and presented to the user in a visual manner. Specifically, in one embodiment, a price curve representing actual transaction data associated with the specified vehicle configuration may be visually displayed to the user, along with visual references indicating one or more price ranges and one or more reference price points. These visual indicators may be displayed such that a user can easily determine what percentage of consumers paid a certain price or the distribution of prices within certain price ranges. Additionally, the upfront pricing information may be visually presented in the context of this pricing data. By presenting the upfront pricing information for the user's specified vehicle in this context a user may be better able to better determine how such upfront pricing information relates to actual prices paid for the same vehicle.

Furthermore, the interface utilized to present the upfront pricing data to the user may allow, or offer the user the ability, to input (or otherwise provide) his personal information (name, address, phone, comments, etc.). When a user provides such personal information the user may be provided the name, address, etc. of the dealer who is offering the presented upfront price. Additionally, the dealer may be given the personal information of the user by operators of the vehicle data system. In this manner, a user may actually obtain an actual upfront price without providing personal information, and a quality lead provided to a dealer, as it is unlikely that a user will provide such personal information unless he is legitimately interested in purchasing the vehicle at the offered upfront price. Moreover, dealers may be encouraged both to offer lower upfront prices and to actually sell the vehicles at the offered upfront price as only a single dealer's upfront price may be presented to a user, where the dealer's whose upfront price is presented to a user may be based on the upfront price itself (for example lowest price, highest inventory offset, etc.), a quality score associated with the dealers, the inventory of the dealer, the amount a dealer is willing to pay for a lead (for example, a consumer's information) or to have that dealer's price displayed, some combination of these factors, or other factors altogether.

Figure 2:
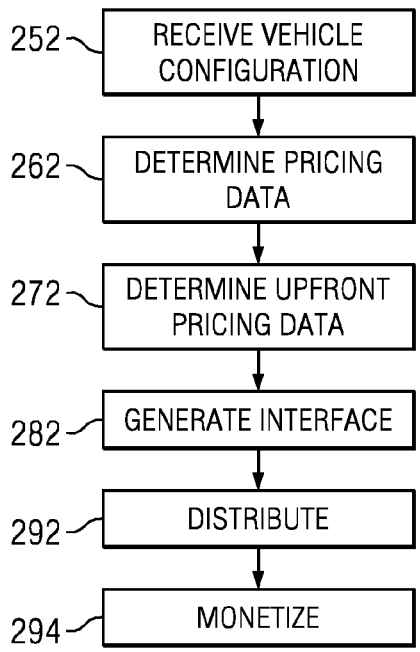
FIG. 2 depicts one embodiment of a method for determining and presenting pricing data and upfront pricing information.

Turning now to FIG. 2, one embodiment of a method for operating a vehicle data system to include sales generation is presented. At step 252 the vehicle data system may receive a specific vehicle configuration through a provided interface. In one embodiment, for example, a user at a web page provided by vehicle data system 120 may select a particular vehicle configuration using one or more menus or may navigate through a set of web pages to provide the specific vehicle configuration. This specified vehicle configuration may comprise values for a set of attributes of a desired vehicle such as a make, model, trim level, one or more options, etc. The user may also specify a geographic locale where he is located or where he intends to purchase a vehicle of the provided specification.

Pricing data associated with the specified vehicle configuration may then be determined by the vehicle data system 120 at step 262. This data may include adjusted transaction prices, mean, median, and probability distributions for pricing data associated with the specified vehicle configuration within certain geographical areas (including, for example, the geographic locale specified); calculating a set of quantifiable price points or ranges (e.g. "average," "good," "great," "overpriced," etc. prices or price ranges); determining historical price trends or pricing forecasts; or determining any other type of desired data. In one embodiment, the data associated with the specified vehicle configuration may be determined using a price ratio model and historical transaction data associated with the specified vehicle configuration as will be discussed.

Upfront pricing information may be determined for the specified vehicle and user at step 272. This upfront pricing information may include an upfront price for the specified vehicle configuration or a vehicle similar in one or more attributes to the specified vehicle configuration. The determination of the upfront pricing information may be based on one or more of a variety of factors including the geographic locale of dealers and the user, quality scores associated with the dealers, inventory of the dealers, an upfront price provided by the dealer or any of a number of other factors. Embodiments of the determination of such upfront pricing information will be discussed in more detail later.

An interface for presentation of the determined pricing data and upfront pricing information associated with the specified vehicle configuration may then be generated at step 282. These interfaces may comprise a visual presentation of such data using, for example, bar charts, histograms, Gaussian curves with indicators of certain price points, graphs with trend lines indicating historical trends or price forecasts, dialogue boxes, pop-up windows, or any other desired format for the visual presentation of data. In particular, in one embodiment, the determined data may be fit and displayed as a Gaussian curve representing actual transaction data associated with the specified vehicle configuration, along with visual indicators on, or under, the curve which indicate determined price points or ranges. One of these visual indicators will correspond to a determined upfront price for a particular dealer. In addition a window may automatically pop-up or pop-up when the upfront price is moused over such that a user may provide personal information. It should be noted here that though the interfaces elaborated on with respect to the presentation of data to a user in conjunction with certain embodiments are visual interfaces, other interfaces which employ audio, tactile, some combination, or other methods entirely may be used in other embodiments to present such data.

The interfaces may be distributed through a variety of channels at step 292. The channels may comprise a consumer facing network based application (for example, a set of web pages provided by vehicle data system 120 which a consumer may access over a network at a computing device such as a computer or mobile phone and which are tailored to the desires of, or use by, consumers); text or multimedia messaging services; widgets for use in web sites or in other application setting, such as mobile phone applications; voice applications accessible through a phone; or almost any other channel desired The distribution of this data through these various channels may be monetized at step 294. In particular, with respect to sales generation, dealers or other entities may pay a fee to the operators of vehicle data system for the ability to provide upfront pricing data on interfaces presented by the vehicle data system or to have a user's personal information provided to them in conjunction with such sales generation. It will be noted that a number of other monetization opportunities may present themselves to operators of the vehicle data system in conjunction with sales generation.

Figure 3:
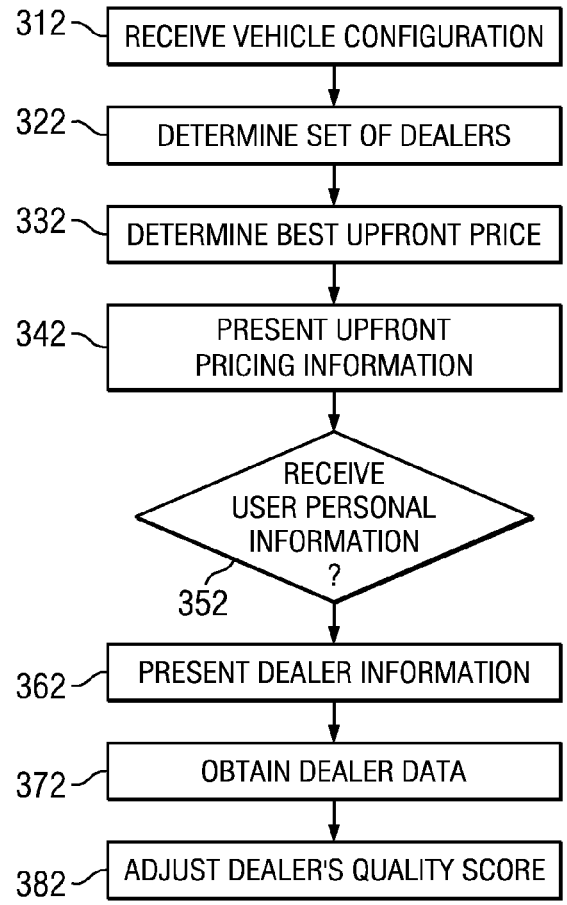
FIG. 3 depicts one embodiment of a method for determining upfront pricing information.

It may be useful here to go into more detail regarding sales generation utilizing embodiments of a vehicle data system. Referring to FIG. 3, one embodiment of a method for the generation of upfront pricing data for a specified vehicle is presented. At step 312 a vehicle configuration may be received. Again, this vehicle configuration may be received through a provided interface. In one embodiment, for example, a user at a web page provided by vehicle data system 120 may select a particular vehicle configuration using one or more menus or may navigate through a set of web pages to provide the specific vehicle configuration. This specified vehicle configuration may comprise values for a set of attributes of a desired vehicle such as a make, model, trim level, one or more options, etc. The user may also specify a geographic locale where he is located or where he intends to purchase a vehicle of the provided specification.

At step 322 then, using the specified vehicle configuration a set of dealers may be determined. This selected set of dealers may be determined based on a wide variety of factors. One of these factors may be geography, for example any dealers which are within a certain distance of the user's specified geographic locale may be selected. The determination of the set of dealers may also be based on the selected dealer's inventories. For example, in one embodiment only dealers which have the make and model of the vehicle may be selected, or dealers which have the vehicles of the specified make, model and trim. In another embodiment, a percentage match may be performed between the vehicles in stock at each of the dealers, and only those dealers which currently have a vehicle which matches the user's specified vehicle configuration over a certain percentage may be selected. Other factors, combinations of factors and algorithms for applying these factors to select dealers may also be utilized.

In one particular embodiment, a quality score may be utilized, at least in part, to select dealers. More specifically, a quality score may be associated with each dealer, where the quality score is determined based on a correlation between the upfront prices offered by the dealer and the actual price at which a vehicle was actually sold to a user to whom the price was offered. Specifically, dealers who published "bait and switch" prices will have their quality score reduced (in other words, the quality score will be reduced when there is some threshold amount difference between the upfront prices offered and the price at which the vehicle associate with the upfront price was actually sold to a user). This quality score may then be utilized in an algorithm utilized to select dealers.

Next, the best upfront price from the selected set of dealers may be determined at step 332. The criteria user to determine which upfront price is best may involve a variety of factors including, for example, the upfront price offered by a dealer, a quality score associated with a dealer, the geographic proximity of the dealer to the user, or some other factor entirely. In one embodiment, as discussed above in many cases a dealer may not have a vehicle of the user's exact desired configuration in certain embodiments, thus instead of providing an upfront price corresponding to each possible vehicle configuration a dealer may provide an invoice offset which may, for example, be associated with that dealer and with a particular vehicle make, a particular vehicle make and model, a vehicle make, model and trim, etc. Thus, leveraging the fact that the vehicle data system may have access to invoice pricing data an upfront price for a dealer for the specified vehicle configuration may be calculated by determining an invoice price for the specified vehicle configuration and adding (or subtracting) the invoice offset associated with the specified vehicle configuration (or certain attributes thereof) provided by that dealer. The lowest upfront price may then be selected as the best upfront price.

In one embodiment, before selecting the best upfront price the quality score for a dealer may be utilized to adjust the upfront price for that dealer, such that the quality scores of a dealer can be used to adjust the upfront prices calculated for the selected set of dealers and influence which dealer's upfront price is determined to be best. It will be noted with respect to the embodiments of sales generation discussed, quality score may be utilized to select dealers, determine upfront pricing, some combination of both or dealer quality scores may not be utilized at all in conjunction with certain embodiments. In one particular embodiment, the determination of which dealer and upfront price is selected may be determined using a combination of how much each dealer is willing to pay for a lead or to have their price displayed (where the higher the amount may be result in a higher likelihood of that dealer's upfront price being selected); the size of the upfront price (where the lower the upfront price the higher the likelihood of it being selected) or the dealer quality score (where a higher quality score increases the likelihood that the dealers upfront price will be selected).

Once the best upfront price is determined it may be presented to a user at 342. In one embodiment, this upfront pricing is presented in the context of pricing data associated with the specified vehicle configuration and the user may be provided with an interface to provide personal information if the user wishes to be presented information on the dealer who is offering the presented upfront price. It should be noted that while such an upfront price might be correct according to the dealer's provided upfront pricing, the pricing may still lead to consumer disappointment (for example, where certain attributes are of extreme importance to a user). To remedy this, the upfront pricing information shown to the consumer can include a percentage vehicle match (potentially including a full breakdown of vehicle attributes) with a vehicle actually available at the dealership.

Figure 4A:
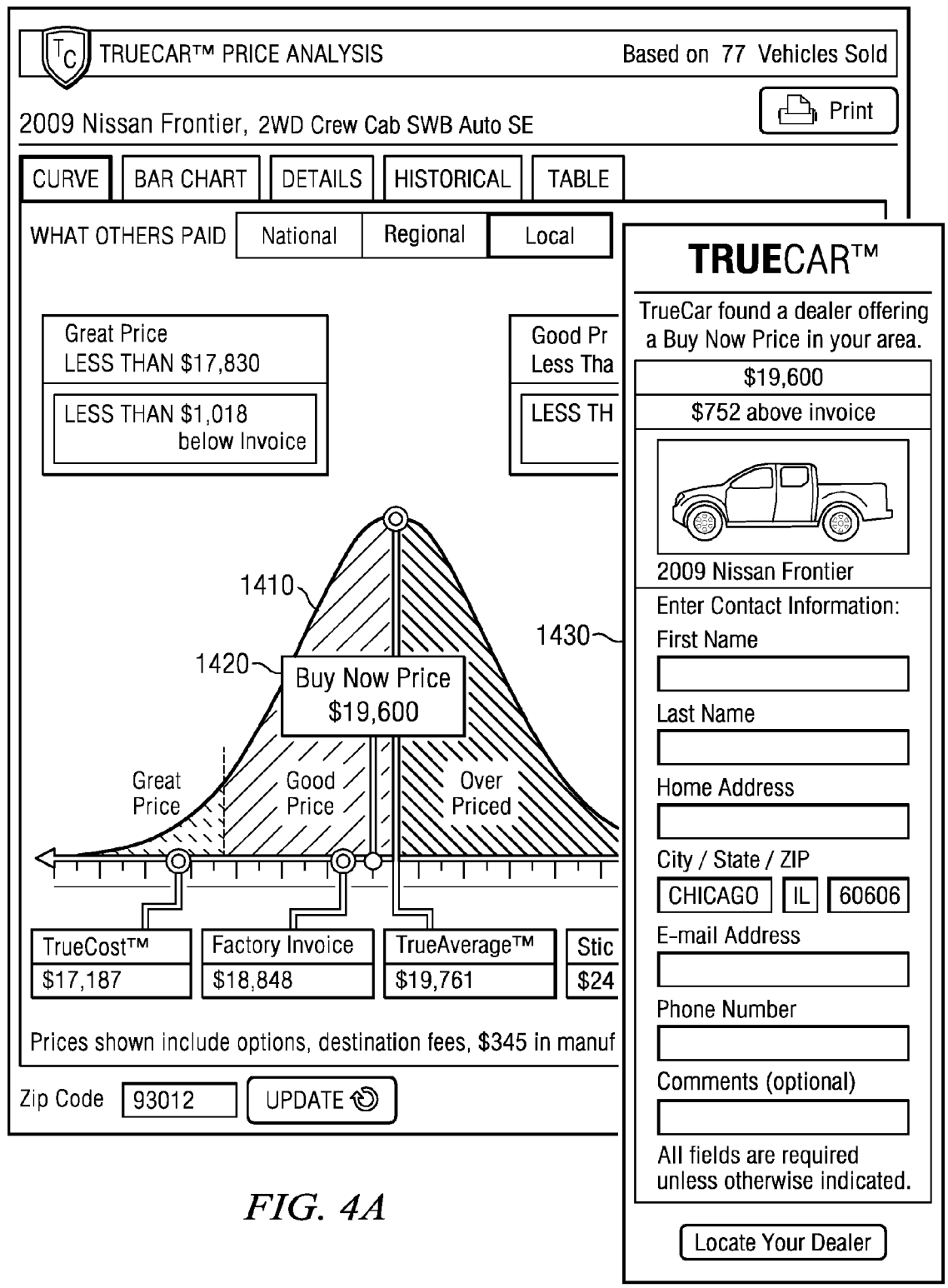

It may now be useful to briefly discuss embodiments of such interfaces in more detail. FIG. 4A depicts one embodiment of an interface for the presentation of upfront pricing information for a specified vehicle configuration to a user in conjunction with the presentation of pricing data for that vehicle configuration. A Gaussian curve 1410 may be shown to illustrate a normalized distribution of pricing (for example, a normalized distribution of transaction prices). On the curve's X-axis, the average price paid may be displayed along with the determined dealer cost, invoice or sticker price to show these prices relevancy, and relation, to transaction prices. The determined "good," "great," "overpriced," etc. price ranges are also visually displayed under the displayed curve to enable the user to identify these ranges.

In addition, an upfront price 1420 may be displayed as a visual indicator on the x-axis such that a user may see where this upfront price 1420 falls in relation to the other presented prices or price ranges. Additionally, a window 1430 may be presented where a user may enter his personal information if he wishes to obtain information on the dealer offering such an upfront price 1420.

Returning to FIG. 3, if such user information is received at step 352 the dealer information may be presented at step 362. FIG. 4B, presents an embodiment of one interface for the presentation of dealer information associated with a presented upfront price. This interface may comprise dealer information, pricing data, vehicle configuration data, and instructions for obtaining the offered upfront price from the dealer.

Referring to FIG. 3 again, at some later point then, at step 372 data pertaining to that dealer may be obtained, such as for example, from a DMS associated with that dealer or manually via follow up surveys or the like. Utilizing the obtained data corresponding to that dealer then, it can be determined if a transaction corresponding to the presented upfront price actually occurred. In other words, it can be determined if a vehicle of the same or a similar configuration was sold to that particular user by that particular dealer. If a corresponding transaction occurred, the transaction price associated with that transaction (the price the user actually paid) may be compared against the upfront price offered by the dealer to that user for the specified vehicle and the comparison used to determine or adjust a quality score corresponding to the dealer at step 382. It will be apparent that almost any algorithm desired may be utilized to generate a quality score from such transaction data and upfront pricing information.

Figure 5A:
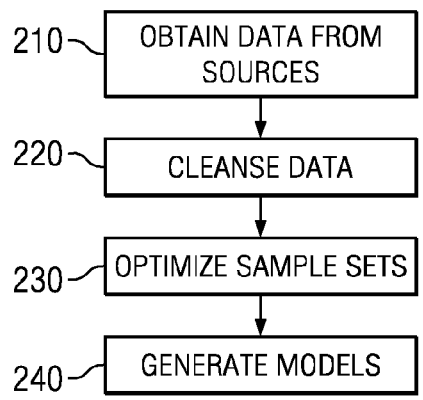
FIGS. 5A and 5B depict one embodiment of a method for determining and presenting pricing data.
Figure 5B:
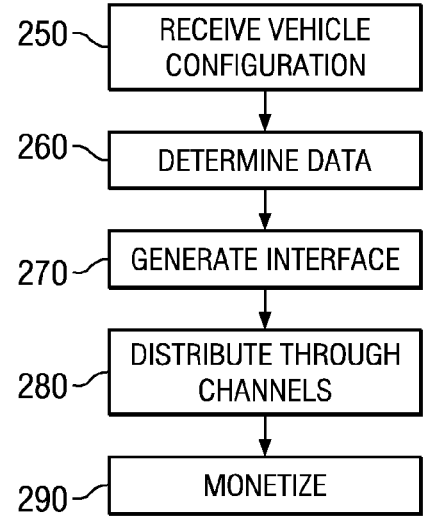

Other embodiments of a vehicle data system which may be utilized in conjunction with embodiments of sales generation as discussed above will now be elaborated on in more detail. Turning now to FIGS. 5A and 5B, one particular embodiment of a method for the operation of a vehicle data system is depicted. Referring first to the embodiment of FIG. 5A, at step 210 data can be obtained from one or more of the data sources (inventory companies 140, manufacturers 150, sales data companies 160, financial institutions 182, DMVs 180, external data sources 184, dealers 130, etc.) coupled to the vehicle data system 120 and the obtained data can be stored in the associated data store 122. In particular, obtaining data may comprise gathering the data by requesting or receiving the data from a data source. It will be noted with respect to obtaining data from data sources that different data may be obtained from different data sources at different intervals, and that previously obtained data may be archived before new data of the same type is obtained and stored in data store 122.

In certain cases, some of the operators of these data sources may not desire to provide certain types of data, especially when such data includes personal information or certain vehicle information (VIN numbers, license plate numbers, etc.). However, in order to correlate data corresponding to the same person, vehicle, etc. obtained from different data sources it may be desirable to have such information. To address this problem, operators of these data sources may be provided a particular hashing algorithm and key by operators of vehicle data system 120 such that sensitive information in data provided to vehicle data system 120 may be submitted and stored in data store 122 as a hashed value. Because each of the data sources utilizes the same hashing algorithm to hash certain provided data, identical data values will have identical hash values, facilitating matching or correlation between data obtained from different (or the same) data source(s). Thus, the data source operators' concerns can be addressed while simultaneous avoiding adversely impacting the operation of vehicle data system 120.

Once data is obtained and stored in data store 122, the obtained data may be cleansed at step 220. The cleansing of this data may include evaluation of the data to determine if it conforms to known values, falls within certain ranges or is duplicative. When such data is found, it may be removed from the data store 122, the values which are incorrect or fall outside a threshold may be replaced with one or more values (which may be known specifically or be default values), or some other action entirely may be taken.

This cleansed data may then be used to form and optimize sample sets of data at step 230. This formation and optimization process may include grouping data into data sets according to geography (for example, national, regional, local, state, county, zip code, DMA, some other definition of a geographic area such as within 500 miles of a location, etc.) and optimizing these geographic data sets for a particular vehicle configuration. This optimization process may result in one or more data sets corresponding to a particular vehicle or group or type of vehicles, a set of attributes of a vehicle and an associated geography.

Using the data sets resulting from the optimization process, a set of models may be generated at step 240. These models may include a set of dealer cost models corresponding to one or more of the data sets resulting from the optimization process discussed above. An average price ratio (for example, price paid/dealer cost) model for the data set may also be generated using the obtained data. It will be noted that these models may be updated at certain intervals, where the interval at which each of the dealer cost models or average price ratio model is generated may, or may not, be related to the intervals at which data is obtained from the various data sources or the rate at which the other model(s) are generated.

Moving on to the portion of the embodiment depicted in FIG. 5B, at step 250 the vehicle data system may receive a specific vehicle configuration through a provided interface. In one embodiment, for example, a user at a web page provided by vehicle data system 120 may select a particular vehicle configuration using one or more menus or may navigate through a set of web pages to provide the specific vehicle configuration. This specified vehicle configuration may comprise values for a set of attributes of a desired vehicle such as a make, model, trim level, one or more options, etc. The user may also specify a geographic locale where he is located or where he intends to purchase a vehicle of the provided specification.

Other information which a user may provide includes incentive data pertaining to the specified vehicle configuration. In one embodiment, when a user specifies a particular vehicle configuration the vehicle data system 120 will present the user with a set of incentives associated with the specified vehicle configuration if any are available. The user may select zero or more of these incentives to apply.

Pricing data associated with the specified vehicle configuration may then be determined by the vehicle data system 120 at step 260. This data may include adjusted transaction prices, mean, median, and probability distributions for pricing data associated with the specified vehicle configuration within certain geographical areas (including, for example, the geographic locale specified); calculating a set of quantifiable price points or ranges (e.g. "average," "good," "great," "overpriced," etc. prices or price ranges); determining historical price trends or pricing forecasts; or determining any other type of desired data. In one embodiment, the data associated with the specified vehicle configuration may be determined using the price ratio model and historical transaction data associated with the specified vehicle configuration as will be discussed.

An interface for presentation of the determined pricing data associated with the specified vehicle configuration may then be generated at step 270. These interfaces may comprise a visual presentation of such data using, for example, bar charts, histograms, Gaussian curves with indicators of certain price points, graphs with trend lines indicating historical trends or price forecasts, or any other desired format for the visual presentation of data. In particular, in one embodiment, the determined data may be fit and displayed as a Gaussian curve representing actual transaction data associated with the specified vehicle configuration, along with visual indicators on, or under, the curve which indicate determined price points or ranges, such as one or more quantifiable prices or one or more reference price points (for example, invoice price, MSRP, dealer cost, market average, dealer cost, internet average, etc.). The user may also be presented with data pertaining to any incentive data utilized to determine the pricing data. Thus, using such an interface a user can easily determine certain price points, what percentage of consumers paid a certain price or the distribution of prices within certain ranges. It should be noted here that though the interfaces elaborated on with respect to the presentation of data to a user in conjunction with certain embodiments are visual interfaces, other interfaces which employ audio, tactile, some combination, or other methods entirely may be used in other embodiments to present such data.

The interfaces may be distributed through a variety of channels at step 280. The channels may comprise a consumer facing network based application (for example, a set of web pages provided by vehicle data system 120 which a consumer may access over a network at a computing device such as a computer or mobile phone and which are tailored to the desires of, or use by, consumers); a dealer facing network based application (a set of web pages provided by the vehicle data system 120 which are tailored to the desires of, or use by, dealers); text or multimedia messaging services; widgets for use in web sites or in other application setting, such as mobile phone applications; voice applications accessible through a phone; or almost any other channel desired. It should be noted that the channels described here, and elsewhere, within this disclosure in conjunction with the distribution of data may also be used to receive data (for example, a user specified vehicle configuration or the like), and that the same or some combination of different channels may be used both to receive data and distribute data.

The distribution of this data through these various channels may be monetized at step 290. This monetization may be achieved in a number of ways, including by selling display or contextual ads, contextual links, sponsorships, etc. in conjunction with one or more interfaces (such as web pages, etc.) provided by vehicle data system 120; providing the ability of users to purchase vehicles from dealers through one or more provided interfaces and charging dealers, users or both to utilize this service; providing a reverse auction system whereby dealers can present prices for particular vehicles to the user and the dealers are charged for this ability, charging dealers or users for the licensing or provisioning of obtained or determined data to the dealers or user; charging for access to tools for manufacturer's, dealers, financial institutions, leasing groups, and other end user's which may include custom analytics or data; or almost any other way desirable to monetize the applications, capabilities or data associated with vehicle data system 120.

As may be apparent from a review of the above discussion, embodiments of vehicle data system 120 may entail a number of processes occurring substantially simultaneously or at different intervals and that many computing devices 110 may desire to access vehicle data system 120 at any given point. Accordingly, in some embodiments, vehicle data system 120 may be implemented utilizing an architecture or infrastructure that facilitates cost reduction, performance, fault tolerance, efficiency and scalability of the vehicle data system 120.

Figure 6:
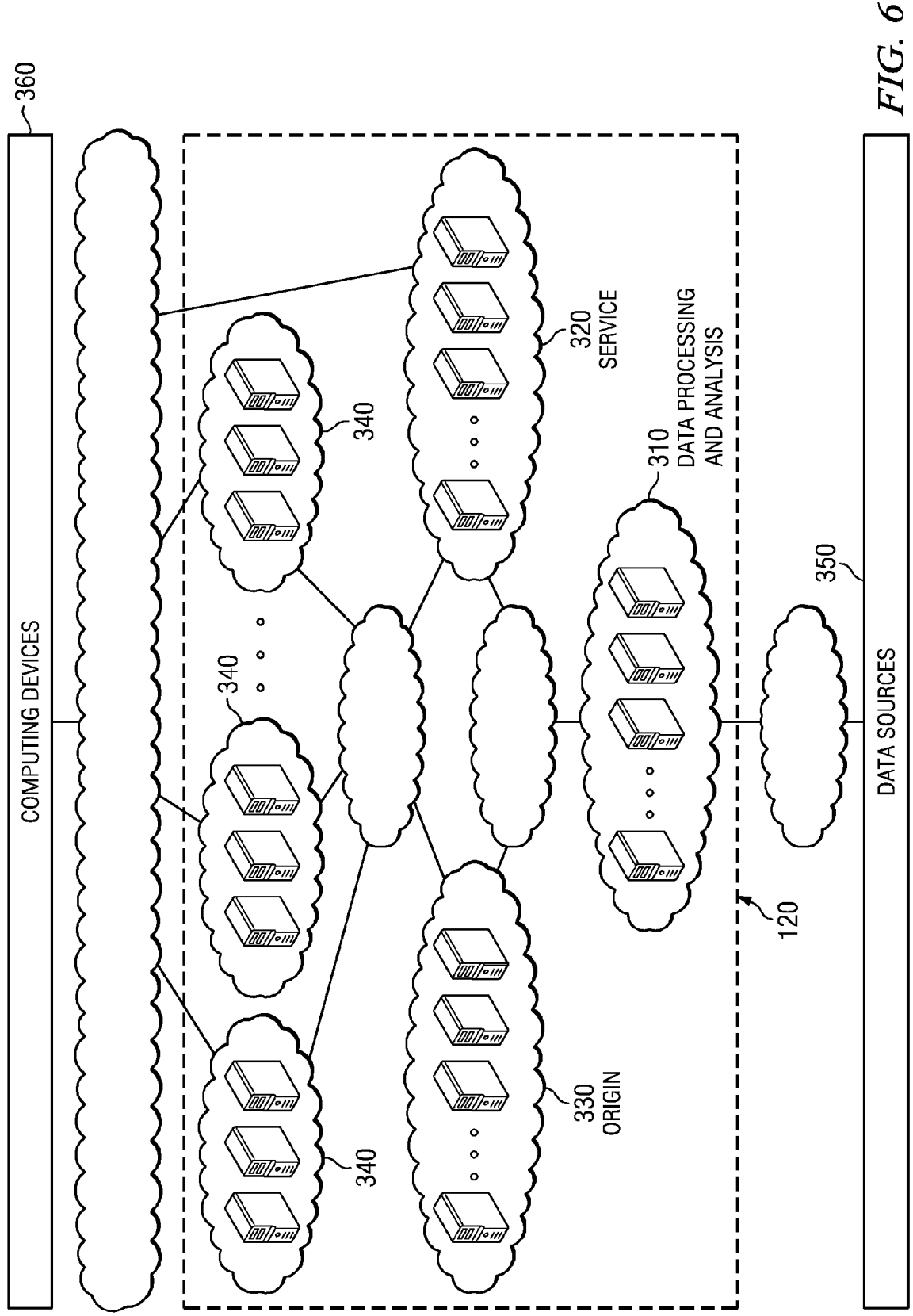
FIG. 6 depicts one embodiment of an architecture for a vehicle data system.

One embodiment of such an architecture is depicted in FIG. 6. Specifically, one embodiment of vehicle data system 120 may be operable to provide a network based interface including a set of web pages accessible over the network, including web pages where a user can specify a desired vehicle configuration and receive pricing data corresponding to the specified vehicle configuration. Such a vehicle data system 120 may be implemented utilizing a content delivery network (CDN) comprising data processing and analysis servers 310, services servers 320, origin servers 330 and server farms 340 distributed across one or more networks, where servers in each of data processing and analysis servers 310, services servers 320, origin servers 330 and server farms 340 may be deployed in multiple locations using multiple network backbones or networks where the servers may be load balanced as is known in the art.

Data processing and analysis servers 320 may interact with one or more data sources 350 (examples of which are discussed above) to obtain data from these data sources 350 at certain time intervals (for example, daily, weekly, hourly, at some ad-hoc variable interval, etc.) and process this obtained data as discussed both above in more detail later herein. This processing includes, for example, the cleansing of the obtained data, determining and optimizing sample sets, the generation of models, etc.

Origin servers 330 may populate a web cache at each of server farms 340 with content for the provisioning of the web pages of the interface to users at computing devices 360 (examples of which are discussed above). Server farms 340 may provide the set of web pages to users at computing devices 110 using web caches at each server farm 340. More specifically, users at computing devices 360 connect over the network to a particular server farm 340 such that the user can interact with the web pages to submit and receive data thorough the provided web pages. In association with a user's use of these web pages, user requests for content may be algorithmically directed to a particular server farm 340. For example, when optimizing for performance locations for serving content to the user may be selected by choosing locations that are the fewest hops, the fewest number of network seconds away from the requesting client or the highest availability in terms of server performance (both current and historical), so as to optimize delivery across the network.

Certain of the web pages or other interfaces provided by vehicle data system 120 may allow a user to request services, interfaces or data which cannot be provided by server farms 340, such as requests for data which is not stored in the web cache of server farms 340 or analytics not implemented in server farms 340. User requests which cannot be serviced by server farm 340 may be routed to one of service servers 330. These requests may include requests for complex services which may be implemented by service servers 330, in some cases utilizing the data obtained or determined using data processing and analysis servers 310.

Figure 7A:
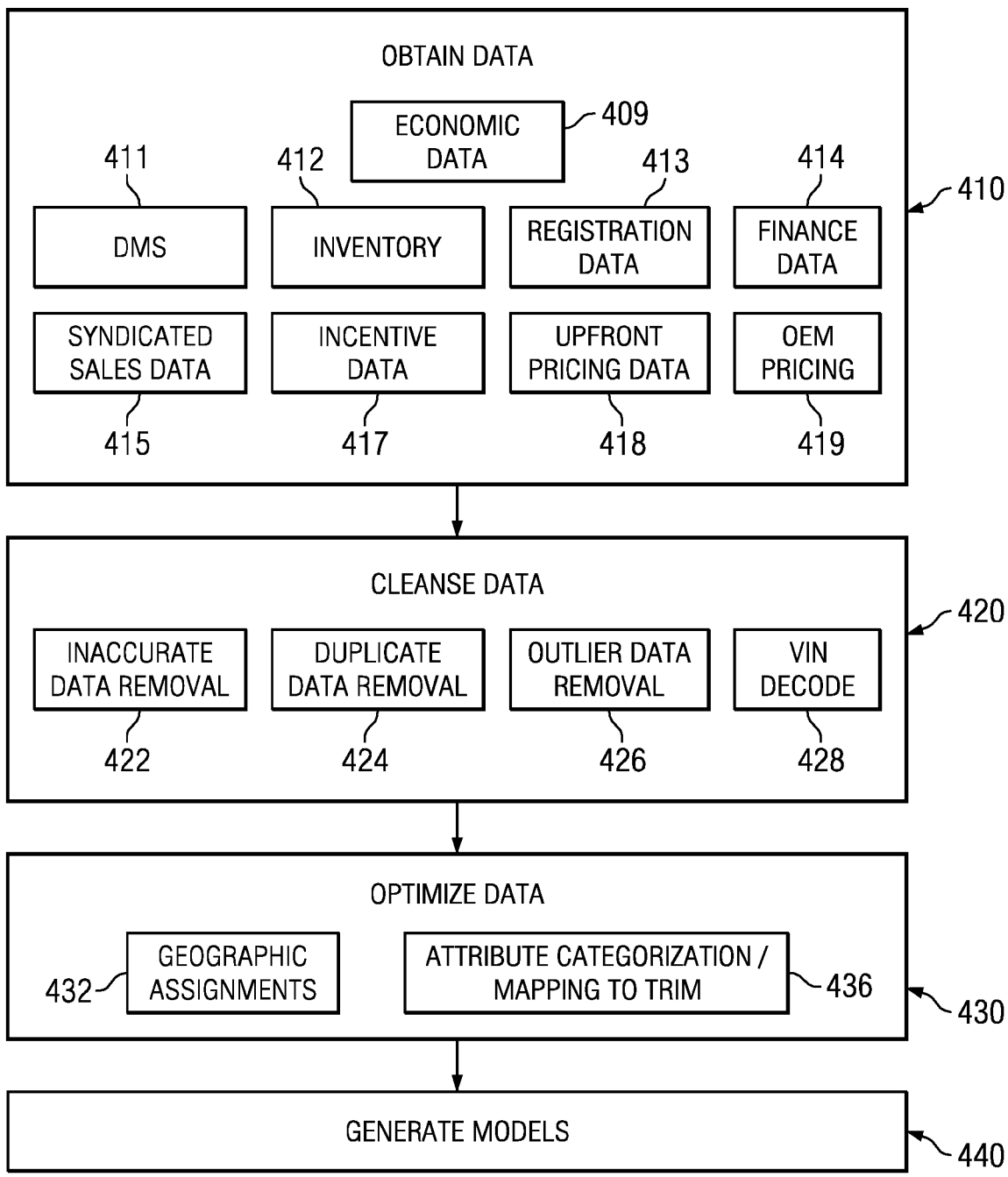
FIGS. 7A and 7B depict one embodiment of a method for determining and presenting pricing data.
Figure 7B:
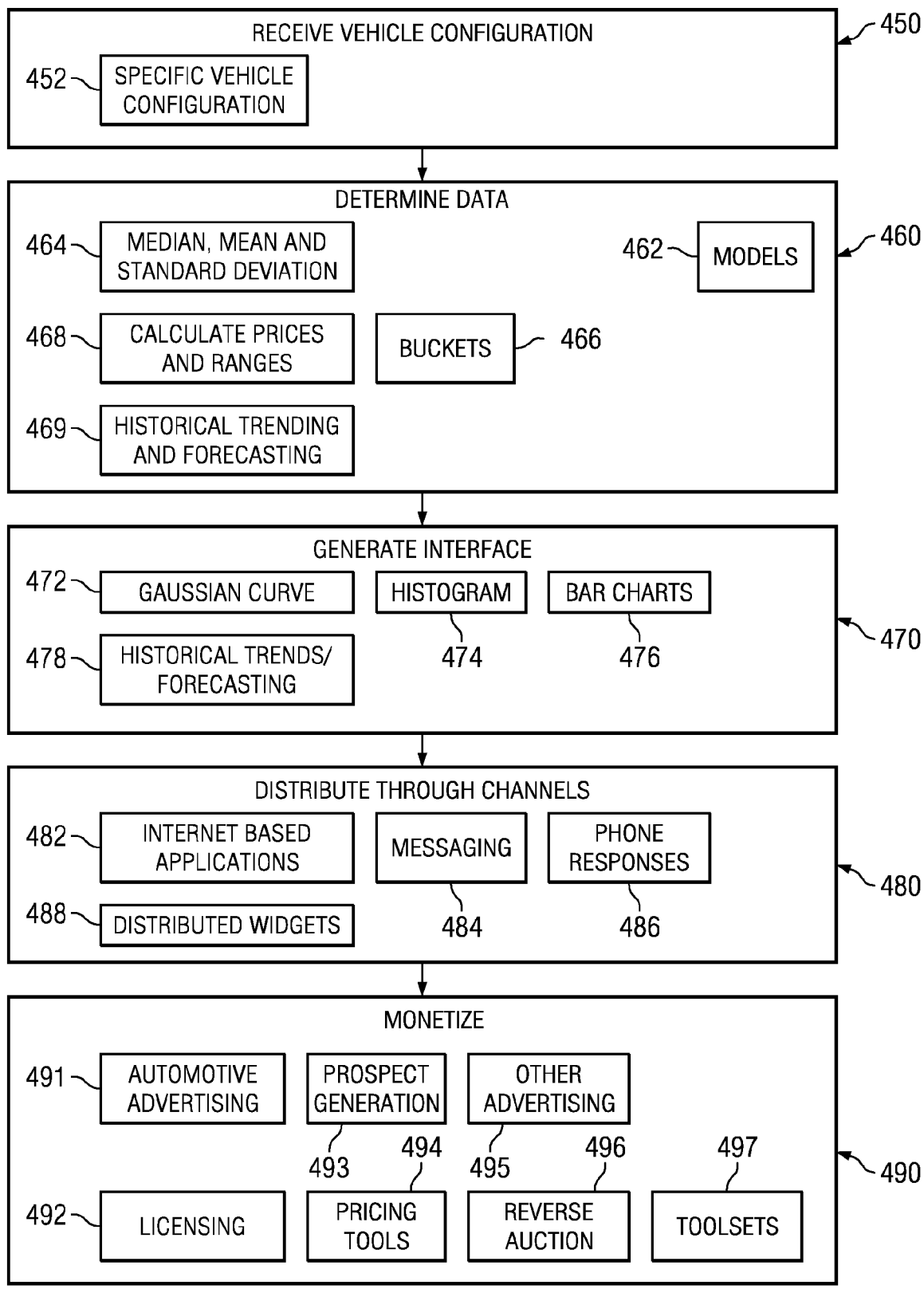

It may now be useful to go over in more detail, embodiments of methods for the operation of a vehicle data system which may be configured according to embodiments above described architecture or another architecture altogether. FIGS. 7A and 7B depict one embodiment of just such a method. Referring first to FIG. 7A, at step 410 data can be obtained from one or more of the data sources coupled to the vehicle data system and the obtained data stored in a data store. The data obtained from these various data sources may be aggregated from the multiple sources and normalized. The various data sources and the respective data obtained from these data sources may include some combination of DMS data 411, inventory data 412, registration or other government (DMV, Sec. of State, etc.) data 413, finance data 414, syndicated sales data 415, incentive data 417, upfront pricing data 418, OEM pricing data 419 or economic data 409.

DMS data 411 may be obtained from a DMS at a dealer. The DMS is a system used by vehicle dealers to manage sales, finance, parts, service, inventory or back office administration needs. Thus, data which tracks all sales transactions for both new and used cars sold at retail or wholesale by the dealer may be stored in the DMS and obtained by the vehicle data system. In particular, this DMS data 411 may comprise data on sales transaction which have been completed by the dealer (referred to as historical sales transactions), including identification of a vehicle make, model, trim, etc. and an associated transaction price at which the vehicle was purchased by a consumer. In some cases, sales transaction data may also have a corresponding dealer cost for that vehicle. As most DMS are ASP-based, in some embodiments the sales transaction or other DMS data 411 can be obtained directly from the DMS or DMS provider utilizing a "key" (for example, an ID and Password with set permissions) that enables the vehicle data system or DMS polling companies to retrieve the DMS data 411, which in one embodiment, may be obtained on a daily or weekly basis.

Inventory data 412 may be detailed data pertaining to vehicles currently within a dealer's inventory, or which will be in the dealer's inventory at some point in the future. Inventory data 412 can be obtained from a DMS, inventory polling companies, inventory management companies or listing aggregators. Inventory polling companies are typically commissioned by a dealer to pull data from the dealer's DMS and format the data for use on web sites and by other systems. Inventory management companies manually upload inventory information (for example, photos, descriptions, specifications, etc. pertaining to a dealer's inventory) to desired locations on behalf of the dealer. Listing aggregators may get data by "scraping" or "spidering" web sites that display a dealer's inventory (for example, photos, descriptions, specifications, etc. pertaining to a dealer's inventory) or receive direct feeds from listing websites (for example, FordVehicles.com).

Registration or other government data 413 may also be obtained at step 410. When a buyer purchases a vehicle it must be registered with the state (for example, DMV, Secretary of State, etc.) for tax, titling or inspection purposes. This registration data 413 may include vehicle description (for example, model year, make, model, mileage, etc.) and a sales transaction price which may be used for tax purposes.

Finance and agreement data 414 may also be obtained. When a buyer purchases a vehicle using a loan or lease product from a financial institution, the loan or lease process usually requires two steps: applying for the loan or lease and contracting the loan or lease. These two steps utilize vehicle and consumer information in order for the financial institution to properly assess and understand the risk profile of the loan or lease. This finance application or agreement data 414 may also be obtained at step 410. In many cases, both the application and agreement include proposed and actual sales prices of the vehicle.

Syndicated sales data 415 can also be obtained by the vehicle data system at step 410. Syndicated sales data companies aggregate new and used sales transaction data from the DMS of dealers with whom they are partners or have a contract. These syndicated sales data companies may have formal agreements with dealers that enable them to retrieve transaction data in order to syndicate the transaction data for the purposes of analysis or purchase by other data companies, dealers or OEMs.

Incentive data 416 can also be obtained by the vehicle data system. OEMs use manufacturer-to-dealer and manufacturer-to-consumer incentives or rebates in order to lower the transaction price of vehicles or allocate additional financial support to the dealer to help stimulate sales. As these rebates are often large (2%-20% of the vehicle price) they can have a dramatic effect on vehicle pricing. These incentives can be distributed to consumers or dealers on a national or regional basis. As incentives may be vehicle or region specific, their interaction with pricing can be complex and an important tool for understanding transaction pricing. This incentive data can be obtained from OEMs, dealers or another source altogether such that it can be used by the vehicle data system to determine accurate transaction, or other, prices for specific vehicles.

As dealers may have the opportunity to pre-determine pricing on their vehicles it may also be useful to obtain this upfront pricing data 418 at step 410. Companies like Zag.com Inc. enable dealers to input pre-determined, or upfront, pricing to consumers. This upfront price is typically the "no haggle" (price with no negotiation) price. Many dealers also present their upfront price on their websites and even build their entire business model around the notion of "no negotiation" pricing. These values may be used for a variety of reasons, including providing a check on the transaction prices associated with obtained historical transaction data.

Additionally, OEM pricing data 419 can be obtained at step 410. This OEM pricing data may provide important reference points for the transaction price relative to vehicle and dealer costs. OEMs usually set two important numbers in the context of vehicle sales, invoice price and MSRP (also referred to as sticker price) to be used as general guidelines for the dealer's cost and price. These are fixed prices set by the manufacturer and may vary slightly by geographic region. The invoice price is what the manufacturer charges the dealer for the vehicle. However, this invoice price does not include discounts, incentives, or holdbacks which usually make the dealer's actual cost lower than the invoice price. According to the American Automobile Association (AAA), the MSRP is, on average, a 13.5% difference from what the dealer actually paid for the vehicle. Therefore, the MSRP is almost always open for negotiation. An OEM may also define what is known as a dealer holdback, or just a holdback. Holdback is a payment from the manufacturer to the dealer to assist with the dealership's financing of the vehicle. Holdback is typically a percentage (2 to 3%) of the MSRP.

Although the MSRP may not equate to an actual transaction price, an invoice price can be used to determine an estimate of a dealer's actual cost as this dealer cost is contingent on the invoice. The actual dealer cost can be defined as invoice price less any applicable manufacturer-to-dealer incentives or holdbacks. The vehicle data system may therefore utilize the invoice price of a vehicle associated with a historical transaction to determine an estimate of the dealer's actual cost which will enable it to determine "front-end" gross margins (which can be defined as the transaction price less dealer cost and may not include any margin obtained on the "back end" including financing, insurance, warranties, accessories and other ancillary products).

Data may also be obtained from a wide variety of other data sources, including economic data 409 related to the current, past or future state of almost any facet of the economy including gas prices, demographic data such as household income, markets, locale(s), consumers, or almost any other type of data desired. The economic data may be specific to, or associated with, a certain geographic area. Additionally, this economic data may comprise an internet index, which may be determined from the average price for a vehicle as reported by certain Internet research sites as the average price for a vehicle. Although these Internet research sites are typically consumer focused, they sell advertising and leads to the automotive dealerships; therefore their paying customers are dealerships and the prices on these sites tend to represent the higher end of the scale, favoring dealerships.

Once the desired data is obtained, the obtained data may be cleansed at step 420. In particular, the data obtained may not be useful if it is inaccurate, duplicative or does not conform to certain parameters. Therefore, the vehicle data system may cleanse obtained data to maintain the overall quality and accuracy of the data presented to end users. This cleansing process may entail the removal or alteration of certain data based on almost any criteria desired, where these criteria may, in turn, depend on other obtained or determined data or the evaluation of the data to determine if it conforms with known values, falls within certain ranges or is duplicative. When such data is found it may be removed from the data store of the vehicle data system, the values which are incorrect or fall outside a threshold may be replaced with one or more values (which may be known specifically or be default values), or some other action entirely may be taken.

In one embodiment, during this cleansing process a VIN decode 428 may take place, where a VIN number associated with data (for example, a historical transaction) may be decoded. Specifically, every vehicle sold must carry a Vehicle Identification Number (VIN), or serial number, to distinguish itself from other vehicles. The VIN consists of 17 characters that contain codes for the manufacturer, year, vehicle attributes, plant, and a unique identity. Vehicle data system may use an external service to determine a vehicle's attributes (for example, make, model year, make, powertrain, trim, etc.) based on each vehicles VIN and associate the determined vehicle information with the sales transaction from which the VIN was obtained. Note that in some cases, this data may be provided with historical transaction data and may not need to occur with respect to one or more of the historical transactions.

Additionally, inaccurate or incomplete data may be removed 422. In one embodiment, the vehicle data system may remove any historical transaction data that does not include one or more key fields that may be utilized in the determination of one or more values associated with that transaction (for example, front end gross, vehicle make, model or trim, etc.). Other high-level quality checks may be performed to remove inaccurate (including poor quality) historical transaction data. Specifically, in one embodiment cost information (for example, dealer cost) associated with a historical transaction may be evaluated to determine if it is congruent with other known, or determined, cost values associated with the make, model or trim of the vehicle to which the historical transaction data pertains. If there is an inconsistency (for example, the cost information deviates from the known or determined values by a certain amount) the cost information may be replaced with a known or determined value or, alternatively, the historical transaction data pertaining to that transaction may be removed from the data store.

In one embodiment, for each historical transaction obtained the following actions may be performed: verifying that the transaction price falls within a certain range of an estimated vehicle MSRP corresponding to the historical transaction (e.g. 60% to 140% of MSRP of the base vehicle); verifying that the dealer cost for the transaction falls within a range of an estimated dealer cost (e.g. 70% to 130% of invoice–holdback of the base vehicle); verifying that a total gross (front end+back end gross) for the historical transaction is within an acceptable range (e.g. −20% to 50% of the vehicle base MSRP); verifying that the type of sale (new/used) aligns to the number of miles of the vehicle (for example, more than 500 miles, the vehicle should not be considered new).

In addition, the new car margin (front-end gross) may be adjusted up or down for transactions that have a high or low back-end gross. This adjustment may be a combination of the magnitude of the back-end gross and a factor based on historical analysis (for example, for a dealership having a sales transaction comprising a trade amount of $5000 and an actual trade value of $7000 and thus made $2000 on the vehicle trade, the front-end gross for this sales transaction vehicle would be increased by this $2000 since this dealer would have accepted a lower transaction price). The front end gross may also be adjusted based on rebates or incentives from the manufacturer that go directly to the dealers, as only a percentage of this rebate gets passed onto the customer. The exact factor to utilize in a given instance may be determined based on historical analysis and current market conditions. For example, if a manufacturer is offering $5000 in marketing support to a dealer, a dealer is not required to pass this money on to the end customer, however, a percentage of this money (e.g. 50%-80%) is usually given to the customer in the form of a lower transaction price). Furthermore, the front-end gross may be adjusted according to a number of minor factors that change the front-end gross based on the accounting practices of an individual dealership. For example, some dealers adjust the front-end gross to affect the salesperson's commission; these adjustments are removed when possible.

Duplicate data may also be removed 424. As there may be many sources for historical transaction data in many cases duplicative historical transaction data may be obtained. As such duplicative data can skew the results of the output of the vehicle data system it may be desired to remove such duplicate data. In cases where uniquely identifiable attributes such as the VIN are available, this process is straight forward (for example, VINs associated with historical transactions may be matched to locate duplicates). In cases where the transaction data does not have a unique attribute (in other words an attribute which could pertain to only one vehicle, such as a VIN, a combination of available attributes may be used to determine if a duplicate exists. For example, a combination of sales date, transaction type, transaction state, whether there was a trade-in on the transaction, the vehicle transaction price or the reported gross may all be used to identify duplicates. In either case, once a duplicate is identified, the transaction data comprising the most attributes source may be kept while the duplicates are discarded. Alternatively, data from the duplicate historical transactions may be combined in some manner into a single historical transaction.

Outlier data can also be removed 426. Outlier data is defined as data that does not appear to properly represent a likely transaction. In one embodiment, historical transaction data pertaining to transactions with a high negative margin (dealer loses too much money) or a high positive margin (dealers appears to earn too much money) may be removed. Removing outlier data may, in one embodiment, be accomplished by removing outlier data with respect to national, regional, local or other geographic groupings of the data, as removing outlier data at different geographic level may remove different sets of transaction data. In addition, relative or absolute trimming may be used such that a particular percentage of the transactions beyond a particular standard deviation may be removed off of the top and bottom of the historical transactions.

After step 420, cleansed data may be stored in a data store associated with the vehicle data system, where the cleansed data includes a set of historical transactions, each historical transaction associated with at least a set of vehicle attributes (for example, make, model, engine type, trim, etc.) and a transaction price or front end gross.

At step 430, then, the cleansed data may be grouped according to geography into data sets using a binning process and these geographic data sets optimized for a particular vehicle configuration. This optimization process may result in one or more data sets corresponding to a specific vehicle or group or type of vehicles, a trim level or set of attributes of a vehicle, and an associated geography.

In one embodiment, permutations of attributes may be iterated over to determine the attribute that has the most significant impact on margin. The iterations may continue until a stack ranked list of attributes from most to least significant impact on the margin are determined. Then, when grouping transactions for a particular location and vehicle this ranked list can be utilized to produce a data set that is both significant and relevant by ignoring or giving less weight to attributes that will impact margin the least.

In order to make vehicle pricing data more accurate, it may be important that timeliness or relevancy of the data presented or utilized be maintained. In one embodiment, then the total number of recent (within a desired time period) and relevant transactions may be optimized with respect to the cleansed data. Relevant data corresponding to a particular geographic region and a particular vehicle may be binned to optimize the quantity of data available for each vehicle within each geographic region. This quantity of data may be optimized to yield bins of historical transaction data corresponding to a trim level (a certain set of attributes corresponding to the vehicle) of a particular model car and an associated geography using geographic assignment of data 432 and attribute categorization and mapping to trim 436.

During geographic assignment of data 432, data is labeled with one or more of national (all data), regional, state, or DMA definition. Attribute categorization and trim mapping 436 may also occur. Vehicle data can be sorted at the trim level (for example, using data regarding the vehicle obtained from a VIN decode or another source). This enables the accurate presentation of relevant pricing based on similar vehicles within a given time frame (optimizing recency). In some cases, a determination may be made that there is not a threshold quantity of data for a specific vehicle at a trim level to determine a statistically significant data corresponding to a time period. The vehicle data system analyzes vehicles at the model (e.g., Accord, Camry, F-150) level and runs analytics at an attribute level (for example, drivetrain, powertrain, body type, cab type, bed length, etc.) to determine if there is a consistency (correlation between attributes and trims) at the attribute level. Since there are a greater number of transactions when binning at an attribute level, attribute level binning may be used instead of trim level binning in these situations, thereby yielding a larger number of historical transactions in a particular data set (relative to just trim level binning), but still relevant, data set to use for processing. It will be noted with respect to these data sets that data within a particular data set may correspond to different makes, models, trim levels or attributes based upon a determined correlation between attributes. For example, a particular data set may have data corresponding to different makes or models if it is determined that there is a correlation between the two vehicles. Similarly, a particular data set may have data corresponding to different trims or having different attributes if a correlation exists between those different trim levels or attributes.

Using the historical transaction data a set of models may be generated at step 440. This model generation process may comprise analyzing individual aspects of the historical transaction data in order to understand the margin for the seller based on the attributes, geography or time of sale. Understanding the margin of individual historical transactions allows these historical transactions to be grouped in statistically significant samples that are most relevant to an individual user based on their specifically configured vehicle and location.

Thus, the generated models may include a set of dealer cost models corresponding to each of the one or more data sets. From these dealer cost models and the historical transaction data associated with a data set, an average price ratio (for example, price paid/dealer cost) may be generated for a data set corresponding to a specific vehicle configuration using a price ratio model. These models will be discussed in more detail later in this disclosure.

Moving on to the portion of the embodiment depicted in FIG. 7B, at step 450 the vehicle data system may receive a specific vehicle configuration 452 through a provided interface. In one embodiment, for example, a user at a web page provided by the vehicle data system may select a particular vehicle configuration using one or more menus or may navigate through a set of web pages to provide the specific vehicle configuration 452. The user may also specify a geographic locale where he is located or where he intends to purchase a vehicle of the provided specification, or may select one or more consumer incentives which the user may desire to utilize in conjunction with a potential purchase. The provided interface may also be used to obtain other data including incentive data pertaining to the specified vehicle configuration. In one embodiment, when a user specifies a particular vehicle configuration an interface having a set of incentives associated with the specified vehicle configuration may be presented to a user if any such incentives are available. The user may select zero or more of these incentives to apply.

Data associated with the specified vehicle configuration which provided by the user may then be determined by the vehicle data system at step 460. Specifically, in one embodiment, the vehicle data system may utilize one or more of models 462 (which may have been determined above with respect to step 440) associated with the vehicle configuration specified by the user (for example, associated with the make, model, trim level or one or more attributes of the specified vehicle) to process one or more data sets (for example, historical transaction data grouped by vehicle make, model, trim or attributes, various geographic areas, etc. associated with the specified vehicle configuration) in order to determine certain data corresponding to the user's specified vehicle.

The determined data corresponding to the specified vehicle configuration may include adjusted transaction prices and mean, median or probability distribution 464 associated with the specified vehicle at a national, regional or local geographical level. The data set corresponding to the specified vehicle may also be bucketed 466 (for example, percentile bucketed) in order to create histograms of data at national, regional, and local geographic levels. "Good," "great," or other prices and corresponding price ranges 468 may also be determined based on median, floor pricing (lowest transaction prices of the data set corresponding to the specified vehicle configuration) or algorithmically determined dividers (for example, between the "good," "great," or "overpriced" ranges). Each price or price range may be determined at national, regional, and local geographic levels. These prices or price ranges may be based on statistical information determined from the data set corresponding to the specified vehicle. For example, "good" and "great" prices or price ranges may be based on a number of standard deviations from a mean price associated with the sales transactions of the data set corresponding to the specified vehicle. For example, a "great" price range may be any price which is more than one half a standard deviation below the mean price, while a "good" price range may be any price which is between the mean price and one half standard deviation below the mean. An "overpriced" range may be anything above the average price or the mean or may be any price which is above the "good" price range.

Historical average transaction prices and forecasts 469 corresponding to the specified vehicle configuration may also be determined at national, regional, and local geographic levels where the forecasted pricing can be determined based on historical trends in the data set corresponding to the specified vehicle, as well as forecasted inventory, model year cycles, incentives or other variables.

Based on the determined data, an interface for the presentation of the determined data may then be generated at step 470. The interface generated may be determined in accordance with a user request received at the vehicle data system based on a user's interaction with other interfaces provided by the vehicle data system. In this manner a user may "navigate" through the interfaces provided by the vehicle data system to obtain desired data about a specified vehicle configuration presented in a desired manner.

These interfaces may serve to communicate the determined data in a variety of visual formats, including simplified normal distributions and pricing recommendations based on one or more data sets. In some embodiments, a price distribution for a particular data set associated with a specified vehicle configuration can be presented to users as a Gaussian curve 472. Using the normal distribution of transaction data in a given geographic area, the mean and the variance of pricing can be visually depicted to an end user. Visually, the Gaussian curve 472 may be shown to illustrate a normalized distribution of pricing (for example, a normalized distribution of transaction prices). On the curve's X-axis, the average price paid may be displayed along with the determined dealer cost, invoice or sticker price to show these prices relevancy, and relation, to transaction prices. The determined "good," "great," "overpriced," etc. price ranges are also visually displayed under the displayed curve to enable the user to identify these ranges. Incentive data utilized to determine the presented data may also be displayed to the user.

A histogram 474 may also be created for display to a user. The histogram is a graphical display of tabulated frequencies of the data set or determined data comprising a set of bars, where the height of the bar shows the percentage of frequency, while the width of the bars represents price ranges. On the histogram's X-axis, the average price paid, dealer cost, invoice, and sticker price may be displayed to show their relevancy, and relation, to transaction prices. The determined "good," "great," etc. prices or ranges may also visually displayed with the histogram to enable the user to identify these ranges. Incentive data utilized to determine the presented data may also be displayed to the user.

Interfaces for determined historic trends or forecasts 478 may also be generated. For example, a historical trend chart may be a line chart enabling a user to view how average transaction prices have changed over a given period of time. The Y-axis represents the percentage change over given time periods while the X-axis represents given time periods. The user will also be able to view the average transaction price and average incentives over each given time period. In addition, the user will also be able to see how prices may change in the future based on algorithmic analysis. Other types of interfaces, such as bar charts illustrating specific price points (for example, average price paid, dealer cost, invoice, and sticker price) and ranges (for example, "good," "great," "overpriced," etc.) in either a horizontal or vertical format, may also be utilized.

Using these types of visual interfaces may allow a user to intuitively understand a price distribution based on relevant information for their specific vehicle, which may, in turn, provide these users with strong factual data to understand how much variation there is in pricing and to negotiate, and understand what constitutes, a good deal. Additionally, by displaying the data sets associated with different vehicles in substantially the same format users may be able to easily compare pricing data related to multiple vehicles or vehicle configurations.

The generated interfaces can be distributed through a variety of channels at step 480. It will be apparent that in many cases the channel through which an interface is distributed may be the channel through which a user initially interacted with the vehicle data system (for example, the channel through which the interface which allowed the user to specify a vehicle was distributed). However, it may also be possible to distribute these interfaces through different data channels as well. Thus, interfaces which present data sets and the results of the processing of these data sets may be accessed or displayed using multiple interfaces and will be distributed through multiple channels, enabling users to access desired data in multiple formats through multiple channels utilizing multiple types of devices. These distribution methods may include but are not limited to: consumer and dealer facing Internet-based applications 482. For example, the user may be able access an address on the World Wide Web (for example, www.truecar.com) through a browser and enter specific vehicle and geographic information via its web tools. Data pertaining to the specific vehicle and geographic information may then be displayed to the user by presenting an interface at the user's browser. Data and online tools for the access or manipulation of such data may also be distributed to other automotive related websites and social networking tools throughout the web. These Internet-based applications may also include, for example, widgets which may be embedded in web sites provided by a third party to allow access to some, or all, of the functionality of the vehicle data system through the widget at the third party web site. Other Internet-based applications may include applications that are accessible through one or more social networking or media sites such as Facebook or Twitter, or that are accessible through one or more APIs or Web Services.

A user may also use messaging channels 484 to message a specific vehicle's VIN to the vehicle data system (for example, using a text, picture or voice message). The vehicle data system will respond with a message that includes the specific vehicle's pricing information (for example, a text, picture or voice message). Furthermore, in certain embodiment, the geographical locale used to determine the presented pricing information may be based on the area code of a number used by a user to submit a message or the location of a user's computing device. In certain cases, if no geographical locale can be determined, one may be asked for, or a national average may be presented.

In one embodiment, a user may be able to use phone based applications 486 to call the vehicle data system and use voice commands to provide a specific vehicle configuration. Based on information given, the vehicle data system will be able to verbally present pricing data to the user. Geography may be based on the area code of the user. If an area code cannot be determined, a user may be asked to verify their location by dictating their zip code or other information. It will be noted that such phone based applications 486 may be automated in nature, or may involve a live operator communicating directly with a user, where the live operator may be utilizing interfaces provided by the vehicle data system.

As the vehicle data system may provide access to different types of vehicle data in multiple formats through multiple channels, a large number of opportunities to monetize the vehicle data system may be presented to the operators of such a system. Thus, the vehicle data system may be monetized by its operators at step 490. More specifically, as the aggregated data sets, the results or processing done on the data sets or other data or advantages offered by the vehicle data system may be valuable, the operators of the vehicle data system may monetize its data or advantages through the various access and distribution channels, including utilizing a provided web site, distributed widgets, data, the results of data analysis, etc. For example, monetization may be achieved using automotive (vehicle, finance, insurance, etc.) related advertising 491 where the operators of the vehicle data system may sell display ads, contextual links, sponsorships, etc. to automotive related advertisers, including OEMs, regional marketing groups, dealers, finance companies or insurance providers.

Additionally, the vehicle data system may be monetized by facilitating prospect generation 493 based on upfront, predetermined pricing. As users view the vehicle data system's interfaces they will also have the option to accept an upfront price (which may, for example, fall into the presented "good" or "great" price ranges). This price will enable a user to purchase a car without negotiating.

Operators of the vehicle data system may also monetize its operation by implementing reverse auctions 496 based on a dealer bidding system or the like. Dealers may have an opportunity through the vehicle data system to bid on presenting upfront pricing to the user. The lower the price a dealer bids, the higher priority they will be in the vehicle data system (for example, priority placement and first price presented to user), or some other prioritization scheme may be utilized. Users will be able to view bidders in a user-selected radius of the user's zip code or other geographic area and select a winning bidder.

The operators of vehicle data system may also license 492 data, the results of data analysis, or certain applications to application providers or other websites. In particular, the operators of the vehicle data system may license its data or applications for use on or with certain dealer tools, including inventory management tools, DMS, dealer website marketing companies, etc. The operators of the vehicle data system may also license access to its data and use of it tools on consumer facing websites (for example, Yahoo! Autos or the like).

Monetization of the vehicle data system may also be accomplished by enabling OEMs to buy contextual ads 495 on certain applications such as distributed widgets or the like. Users may see such ads as "other vehicles to consider" on the widget. The operators may also develop and sell access to online tools 497 for OEMs, finance companies, leasing companies, dealer groups, and other logical end users. These tools 497 will enable customers to run customized analytic reports which may not be available on the consumer facing website, such as statistical analysis toolsets or the like.

As the accuracy and the specificity of pricing information may be a significant advantage of embodiments of a vehicle data system presented herein, it may now be useful to present an overview of embodiments of the analytics which may be employed by a vehicle data system to illustrate how such pricing information is determined. Specifically, in one embodiment the data feeds from information sources may be leveraged to model variables and build multivariable regressions. More particularly, in one embodiment, using one set of historical data a set of dealer cost models may be determined as a formula based on invoice and MSRP data and, using a second set of historical data a price ratio regression model may be determined, such that the vehicle data system may be configured to utilize these determined dealer cost models and the price ratio regression model in the calculation of pricing data corresponding to a user specified vehicle configuration.

When such a specified vehicle configuration is received, the historical transaction data associated with that specified vehicle configuration can be obtained. The transaction prices associated with the historical transaction data can be adjusted for incentives and the dealer cost model and price ratio model applied to determine desired data to present to the user. Specifically, in one embodiment, the user may provide such a specific vehicle configuration to the vehicle data system using an interface provided by the vehicle data system. The user may also select one or more currently available incentives to apply, where the currently available incentives are associated with the specified vehicle configuration. The specified vehicle configuration may define values for a set of attributes of a desired vehicle (for example, including transmission type, MSRP, invoice price, engine displacement, engine cylinders, # doors, body type, geographic location, incentives available, etc.) where the values for these attributes may be specified by the user or obtained by the vehicle data system using the values of attributes specified by the user. Based on the values of these attributes, the specified vehicle's bin may be identified. In one embodiment, a bin for a vehicle can be is defined as the group of vehicles that have the same year, make, model and body type for which there is historical transactions data within a certain time period (for example, the past four weeks or some other time period).

Using the pricing information associated with the historical transactions in the bin corresponding to the specified vehicle, steady state prices may be determined by removing incentives from the prices in the historical transaction data. Once accurate transaction prices are determined, an average price and average cost for the specified vehicle may be computed using the historical transaction data associated with the bin of the specified vehicle. This bin-level determined average price and average cost may, in turn, be used along with the specified vehicle configuration to determine the average price ratio for the specified vehicle by plugging these values into the price ratio regression model and solving. Using this average price ratio and the prices paid (for example, adjusted for incentives) corresponding to the historical transaction data within the specified vehicle's bin, certain price ranges may be computed (for example, based on standard deviations from a price point (for example, the mean)). A Gaussian curve can then be fit parametrically to the actual price distributions corresponding to the historical transaction data of the bin and the result visually displayed to the user along with the computed price points.

Figure 8:
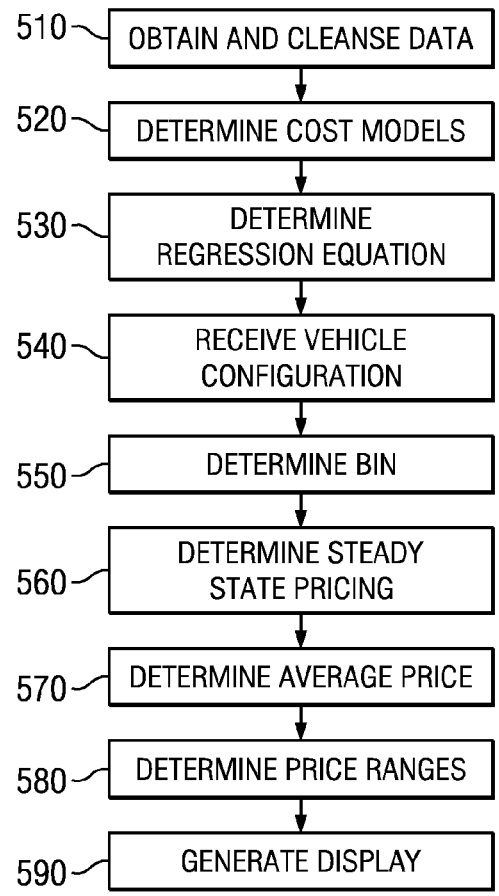
FIG. 8 depicts one embodiment for a method for determining and presenting pricing data.

Turning to FIG. 8, one embodiment for a method of determining accurate and relevant vehicle pricing information is depicted. At step 510 data may be obtained and cleansed as described above. This data includes a set of historical transaction data, where the historical transaction data may comprise data on a set of transactions which have occurred, where data for a particular historical transaction may comprise one or more prices associated with a vehicle actually sold to a consumer, including for example, an invoice price, a dealer cost, an MSRP, a price paid by the consumer (also known as a transaction price), etc. and values for a set of attributes corresponding to the vehicle sold (for example, make, model, transmission type, number of doors, power train, etc.). This historical transaction data may then be cleansed. This cleansing may entail an exclusion of certain historical transactions based on data values (for example a transaction having a sale price of $5,021 may be deemed to be too low, and that sales transaction excluded) or the replacement of certain values associated with a historical transaction.

In certain embodiments, it may be desirable to be able to accurately determine dealer cost associated with historical transactions, as this dealer cost may be important in determining pricing data for a user, as will be discussed. While certain data sources may supply gross profit data in conjunction with provided historical transaction data, and this gross profit field may be used to determine dealer cost, this gross profit data is often times unreliable. In one embodiment, then, when historical transaction data is cleansed, a dealer cost corresponding to each of a set of historical transactions may be determined using the dealer cost models associated with the vehicle data system, and the determined dealer cost associated with the corresponding historical transaction if the historical transaction does not have an associated dealer cost. Additionally, a dealer cost which is associated with a received historical transaction may be evaluated utilizing a determined dealer cost corresponding to that transaction such that the original dealer cost may be replaced with the determined dealer cost if the original dealer cost is determined to deviate from the determined dealer cost by some threshold, or is otherwise determined to be incorrect. Embodiments of methods for the determination of dealer cost for use in this type of cleansing will be described in more detail at a later point with reference to FIG. 22.

Once the historical transaction data is obtained and cleansed, dealer cost models may be determined at step 520. More specifically, in one embodiment, a dealer cost model may be generated for each of a set of manufacturers by analyzing invoice data corresponding to that manufacturer (which may be received from dealers). In particular, the invoice data may be analyzed to determine the equation for deriving holdback in the dealer cost relationship (for example, where dealer cost=invoice−holdback).

The invoice data usually provided with each vehicle invoice contains the following: the holdback price, the invoice price, the freight charges and MSRP, among other data. Thus, taking each vehicle invoice as a separate observation and assuming that each equation for the dealer cost always takes a similar form, the various forms of the equation can be plotted to see which equation holds most consistently across observations. The equation which holds most consistently can be deemed to be the holdback equation (referred to as the dealer cost (DealerCost) model) for that manufacturer.

Figure 9:
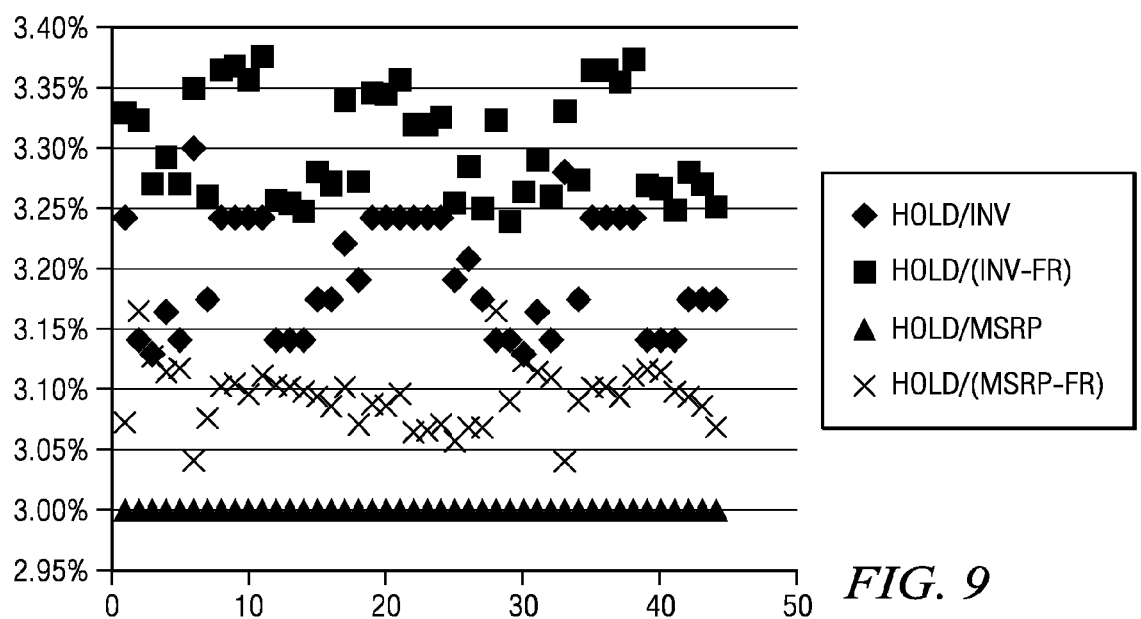
FIG. 9 depicts a distribution associated with the determination of an equation.

Turning briefly to FIG. 9, a graphic depiction of a plot of holdback equations applied to vehicle invoice prices for one particular manufacturer (Ford) is presented. Here, holdback can be determined to be: holdback=0.03*(configured msrp−freight) for this particular manufacturer, as this is the only form that holds constant across invoices associated with Ford. It will be noted that the determination of these dealer cost models may take place at almost any time interval desired, where the time interval may differ from the time interval used to obtain data from any of the data sources, and that these dealer cost models need not be determined anew when new data is obtained. Thus, while the determination of dealer cost models has been described herein with respect to the embodiment depicted in FIG. 8 it will be noted that this step is not a necessary part of the embodiment of the method described and need not occur at all or in the order depicted with respect to his embodiment. For example, dealer cost models may be determined offline and the vehicle data system configured to use these provided dealer cost models.

Returning to FIG. 8, in addition to the dealer cost models, a price ratio regression equation may be determined at step 530 using historical transaction data Utilizing global multi-variable regression, then, one embodiment a price ratio equation may be of the form where $f(x)=\Sigma_{i=0}^{n}\Sigma_{k=0}^{m}(\beta_i X_i X_{bk})$ where $X_i$ signifies global variables, $X_{bik}$ signifies bin-level variables for specific bins b, and $\beta_i$'s are coefficients. In one embodiment, for example, the price ratio (PriceRatio) equation may be PriceRatio=a0+a1*PRbin+a2*PRbin*dealercost+a3*PRbin*cylinders+a4*PRbin*drive+a5*PRbin*daysinmarket+Σ($a_k$*PRbin*$state_k$) where $a_i$=coefficients, PRbin is the 4-week average price ratios for all transactions in a bin associated with a given vehicle, dealercost is a steady-state (incentives adjusted) dealer cost for the given vehicle, cylinders are the number of cylinders the given has, drive is the number of drive wheel in the drivetrain (e.g. 2 or 4 wheel drive), daysinmarket is the number of days the model of the given vehicle has been on the marketplace and state is an array of indicator variables specifying the geographic state of purchase. With this price ratio equation it is possible to compute average price paid for the given vehicle where average price paid (Avg Price Paid) equals PriceRatio (as determined from the price ratio regression equation) multiplied by DealerCost (as determined from the dealer cost model for the manufacturer of the given vehicle) or Avg Price Paid=PriceRatio(DealerCost).

In one embodiment, it may be desirable to model price ratios at a local level. Accordingly, certain embodiments of a price ratio equation may account for this desire by incorporation of zip code level modeling. For example, in the price ratio equation above, in place of an array of indicator variables identifying a state, variables to capture the zipcode may be included. In the context of vehicle pricing data just incorporating a series of indicator variables identifying zipcode may, however, be less effective due to data sparsity issues, while a straight continuous mapping of zipcode may also be less effective than desired due to overconstrained implied numerical relationships amongst zipcodes. Accordingly, an indirect continuous mapping may be utilized in certain embodiments, particularly in cases where intermediary variables can be identified. For instance, continuous variables such as median income and median home price can effectively be leveraged as intermediaries. Given that zipcode is directly related (sometimes referred to as a proxy variable) for these effects, it makes sense to use these types of continuous variables as intermediaries.

To accomplish this, in one embodiment first a model which relates zipcode to median income is developed. This model can be, for example, a lookup table of median incomes by zipcode (which can be for example, acquired from the most recent census data). Then, median income is utilized as a variable $X_i$ in, for example, the price ratio equation above. The price ratio equation might then have a component of a6*est_median_income or a6*PRbin*est_median_income, where est_median_income=f(zipcode) (where f(zipocde) refers to a value in the lookup table corresponding to zipcode.) Thus, a price ratio equation of this type may be PriceRatio=a0+a1*PRbin+a2*PRbin*dealercost+a3*PRbin*cylinders+a4*PRbin*drive+a5*PRbin*daysinmarket+a6*PRbin*est_median_income where $a_i$=coefficients, PRbin is the 4-week average price ratios for all transactions in a bin associated with a given vehicle, dealercost is a steady-state (incentives adjusted) dealer cost for the given vehicle, cylinders is the number of cylinders the given has, drive is the number of drive wheel in the drivetrain (e.g., 2 or 4 wheel drive), daysinmarket is the number of days the model of the given vehicle has been on the marketplace and f(zipcode) refers to a value in a lookup table corresponding to the zipcode. It will be noted that a similar approach can be taken with median home prices or any other such potential intermediary variable which it is desired to utilize in conjunction with any type of local level variable (zip code, neighborhood, area code, etc.).

Again, it will be noted that the determination of the price ratio equation to utilize may take place at almost any time interval desired, where the time interval may differ from the time interval used to obtain data from any of the data sources, and that a price ratio equation need not be determined anew when new data is obtained. Thus, while the determination of a price ratio equation has been described herein with respect to the embodiment depicted in FIG. 8 it will be noted that this step is not a necessary part of the embodiment of the method described. For example, a price ratio equation may be determined offline and the vehicle data system configured to use this provided price ratio equation.

Once the data has been gathered, and the dealer models and price ratio regression equation to utilize have been determined, a specified vehicle configuration may be received and a corresponding bin determined at steps 540 and 550, respectively. A specified vehicle configuration may comprise values for a set of attributes of a vehicle (for example, in one embodiment the attributes of year, make, model and body type may be used). Thus, a bin corresponding to a specified vehicle configuration may comprise historical transaction data from a particular time period (for example, four weeks) associated with the values for the set of attributes corresponding to the specified vehicle.

Using the bin corresponding to the specified vehicle, at step 560, steady state pricing for the historical transaction data in the bin may be determined. Steady state prices may be determined by removing incentives from the transaction prices in the historical data. More specifically, transaction prices can be adjusted for incentives using the equation Price_ss (steady state price)=Price (transaction price)+$I_c$+$\lambda I_d$, where $I_c$=consumer incentives applied to the transaction, $I_d$=dealer incentives available for the transaction, and $\lambda$=dealer incentives passthrough rate. Thus, if a historical transaction price included $500 in consumer incentives and $1000 in available dealer incentives for a dealer that has been determined to have a 20% dealer cash passthrough rate, that price would be adjusted to be $700 higher to account for the incentives provided at that time.

For instance, a price paid (transaction price) of $15,234 corresponding to a historical sales transaction for a Honda Civic might have been artificially low due to incentives. Since the incentives are known at the time that historical transaction took place, it can be determined what incentives were available at that time and how they affect the prices corresponding to a historical transaction (for example, what percentage of these incentives are passed through to the customer). As dealer incentives are unknown to the consumer generally and may or may not be passed through, historical transaction data can be evaluated to determine passthrough percentages for these dealer incentives based on historical averages and adjusted accordingly.

For instance, using the example Honda Civic transaction, a $1500 consumer and a $1000 dealer incentive might have been available. Since consumer incentives are 100% passed through to the consumer, that $1500 may be added to the historical transaction price to adjust the price of the transaction to $16734. For this particular make of vehicle, the manufacturer-to-dealer incentive passthrough rate might have been determined to be 54%. Thus, it may be determined that $540 would be deducted from the price paid by a consumer for this vehicle, on average. Thus, this amount may also be added into the price of the transaction to arrive at a figure of $17274 as the transaction price without incentives for this transaction. Similar calculations may be performed for the other historical transactions in the specified vehicle's bin.

After steady state prices are determined, at step 570 the average dealer cost corresponding to the specified vehicle may be determined using the historical transaction data in the bin (including the adjusted transaction prices corresponding to the historical transactions) and the dealer cost model corresponding to the manufacturer of the specified vehicle. The price ratio corresponding to the specified vehicle may then be determined using the price ratio equation by plugging in values corresponding to the specified vehicle into the bin-level variables of the price ratio equation and solving. Using the determined price ratio, the average price paid (mean) for the specified vehicle may be determined using the equation Avg Price Paid=PriceRatio*DealerCost.

In one embodiment, at this point, if there are currently any incentives available for the specified vehicle the adjusted transaction prices for the historical transactions and the average price paid can be scaled based on these incentives. In particular, utilizing a presented interface a user may have selected on or more consumer incentives offered in conjunction with specified vehicle configuration. These specified consumer incentives may be utilized to adjust the transaction price. More specifically, these transaction prices may be further adjusted based on a process similar to that used in determining steady state pricing, which accounts for current incentives. Thus, the equation may be Price (transaction price)= Price_ss (steady state)−$I_c \lambda I_d$, where $I_c$=consumer incentives applied to the transaction, $I_d$=dealer incentives available for the transaction, and $\lambda$=dealer incentives passthrough rate or Avg Price Paid$_{final}$=Avg Price Paid$_{computed}$$I_c$−$\lambda I_d$. In this way, as incentives may fluctuate based on geography, it is possible to display prices tailored to the user's local market prices as a way for the user to gauge how much room they have for negotiations, rather than displaying a full range of prices that has been unduly influenced by changes in available incentives. Note that, in some embodiments, it may be also be desirable to adjust the determined average dealer cost downward by the full amount of the consumer and dealer incentives at this time.

Once average price paid is determined for the specified vehicle, at step 580 one or more price ranges may be determined. These price ranges may be determined using the standard deviation determined from the historical transaction data, including the adjusted transaction prices, of the bin. For example, the top end of a "good" price range may be calculated as: Good=Avg Price Paid+0.15*stddev, the top end of a "great" price range can be determined as Great=Avg Price Paid−0.50*stddev, while an "Overpriced" price range may be defined as any price above the "good" transaction price. Alternatively, the "good" price range may extend from the minimum of the median transaction price and the mean transaction price to one-half standard deviation below the mean price as determined based on the historical transaction data of the bin, including the adjusted transaction prices corresponding to the specified vehicle. It will be noted that any other fraction of standard deviation may be used to determine "good," "great," "overpriced" price ranges, or some other method entirely may be used.

A display may then be generated at step 590. In one embodiment, this display may be generated by fitting a Gaussian curve to the distribution of the adjusted transaction prices corresponding to the historical pricing data of the bin associated with the specified vehicle and formatting the results for visual display. In addition, the visual display may have one or more indicators displayed relative to the displayed pricing curve which indicate where one or more pricing ranges or price points are located.

It may be helpful here to illustrate an example in conjunction with a specific vehicle. To continue with the above example, for the manufacturer Ford, suppose that the specified vehicle is a 2009 Ford Econoline Cargo Van, E-150 Commercial with no options. In this case, the dealer cost model for Ford may specify that the dealer cost is calculated off of the base MSRP minus freight charge. From data obtained from a data source it can be determined that MSRP for this vehicle is $26,880 and freight charges are $980. Accordingly, holdback for the specified vehicle is computed as Holdback=$\alpha_0+\alpha_1$ (MSRP−Freight), where $\alpha_0$=0, $\alpha_1$=0.03 (from the above dealer model corresponding to Ford). Thus, holdback=0.03*(26880−980)=777. Base invoice price can be determined to be $23,033 from obtained data, thus Factory Invoice=Base Invoice+Ad fees+Freight=$23,033+$428+ $980=$24,441 and Dealer cost=Factory Invoice−Holdback=$24,441−$777=$23,664

Using prices from historical transaction data corresponding to the 2009 Ford Econoline Cargo Van, E-150 Commercial with no options (the bin) an average price ratio may be determined. As mentioned earlier, these prices may be adjusted for incentives.

Assume now that PriceRatio=$f(x)=\Sigma_{i=0}{}^n\Sigma_{k=0}{}^m(\beta_i X_i X_{bk})$= 1.046 for the 2009 Ford Econoline Cargo Van, E-150 Commercial, in this case Average Price Paid=DealerCost*1.046=$24,752. At this point, if there were any currently available incentives available for the 2009 Ford Econoline Cargo Van, E-150 Commercial with no options adjustments can be made. In this example, there may not be. However, if there were, for example, $1,500 in consumer incentives and $500 in dealer incentives, the prices can be rescaled based on these incentives. Thus, in this scenario, average price paid adjusted=$24,752−$1,500−0.30(500) =$23,102, presuming this vehicle has historically had a 30% passthrough rate.

Figure 10A:
FIGS. 10A and 10B depict embodiments of interfaces for the presentation of pricing data.
Figure 10B:

Turning briefly to FIGS. 10A and 10B one example of interfaces which may be used by a vehicle data system to present such pricing information to a user are depicted. In particular, FIG. 10A is an interface presenting the determined Actual Dealer Cost, Factory Invoice, Average Paid (average price paid) and sticker price for a 2009 Ford Econoline Cargo Van, E-150 Commercial on a national level while FIG. 10B is an interface presenting identical data at a local level.

Accordingly, for this particular example, the case of the 2009 Ford Econoline Cargo Van, E-150 Commercial, the breakout of prices is that the top end of the "good" price range can now calculated as: "good" and "great" ranges are computed as follows: "good" extends from the min(median(P), mean(P)) down to one-half standard deviation below the mean price over recent transactions. The "great" price range extends from one-half standard deviation below the mean and lower. So, for the Econoline in this example, with no options: Average price=$24,752 nationally, the upper end of the "good" price range=$24,700 (the median of the data in this example) and the upper end of the "great" price range=24752−0.5*$\sigma_b$=24752−0.5(828)=$24,338.

Figure 11A:
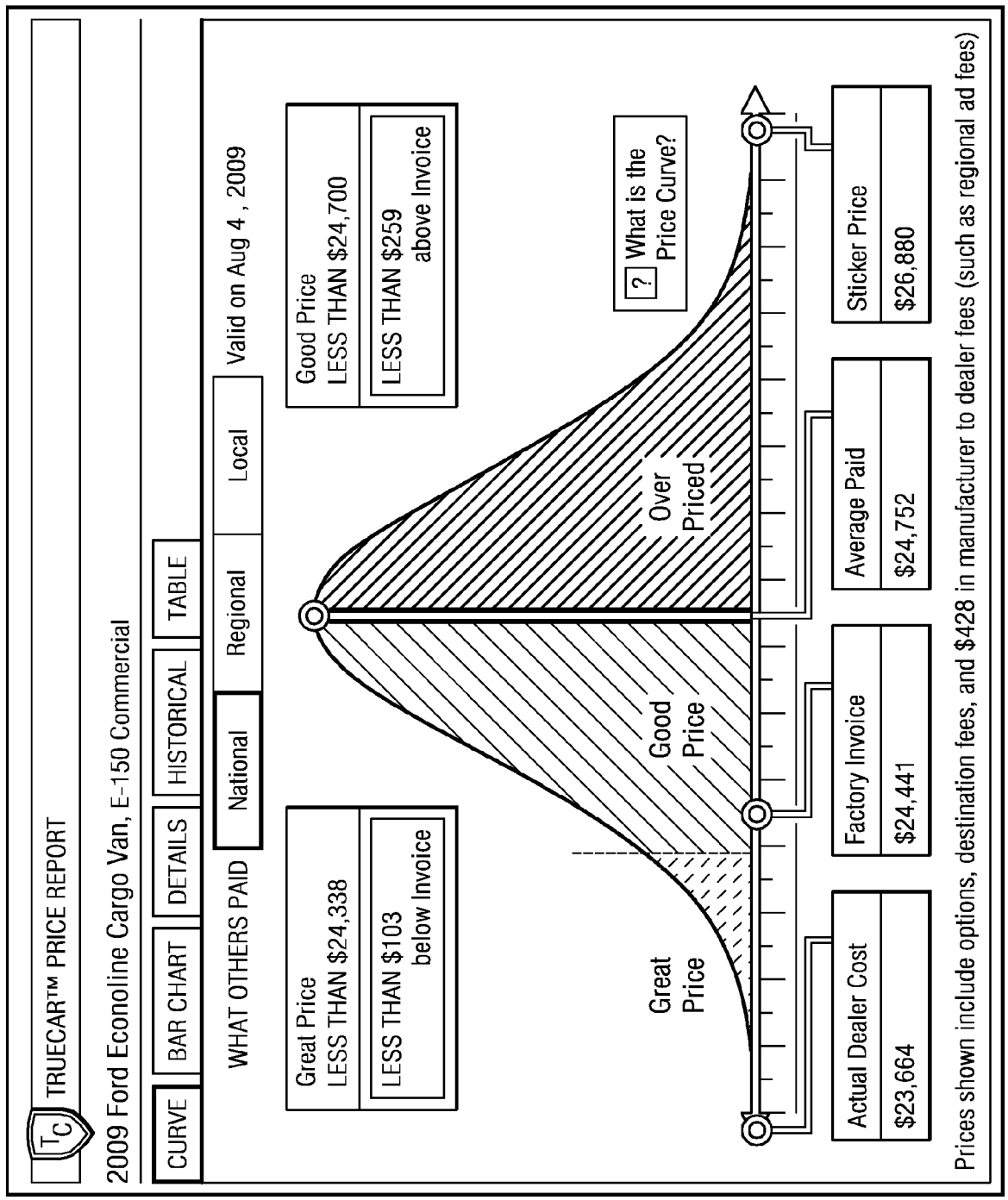
FIGS. 11A and 11B depict embodiments of interfaces for the presentation of pricing data.
Figure 11B:
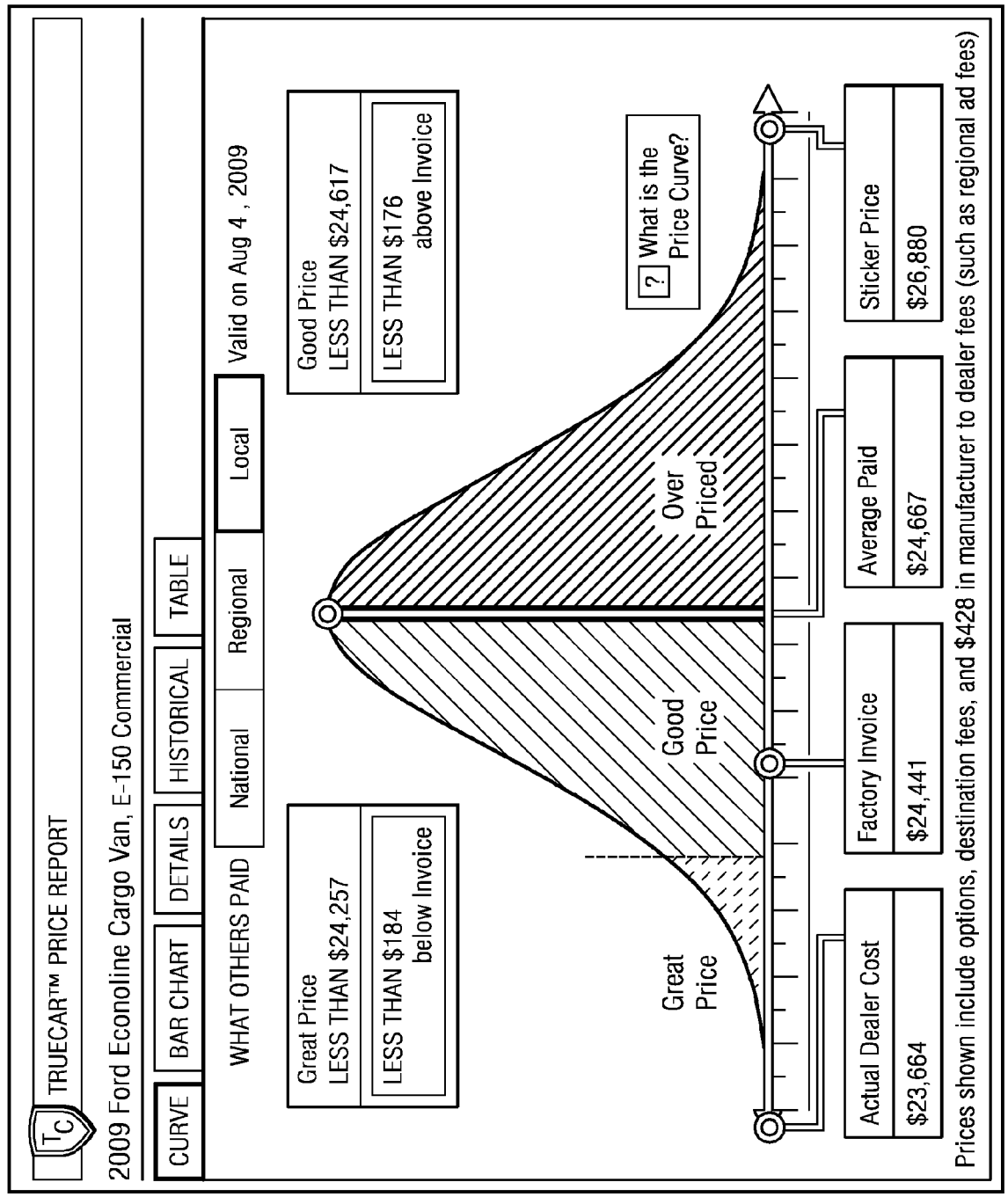

A Gaussian curve can then be fit parametrically to the actual price distributions of the historical transaction data corresponding to the 2009 Ford Econoline Cargo Van, E-150 Commercial to produce embodiments of the visual display depicted in FIGS. 11A and 11B. Here, FIG. 11A is an interface visually presenting the national level price distribution for the 2009 Ford Econoline Cargo Van, E-150 Commercial after the Gaussian curve fitting process where the price points "Actual Dealer Cost", "Factory Invoice", "Average Paid" (average price paid) and "Sticker Price" for a 2009 Ford Econoline Cargo Van, E-150 Commercial are indicated relative to the price curve depicting the pricing distributions for the 2009 Ford Econoline Cargo Van, E-150 Commercial. Additionally, the "good" and "great," and "overpriced" price ranges are indicated in relation to the presented pricing curve. FIG. 11B presents a similar pricing curve related to local level data for the same vehicle.

It may be illustrative of the power and efficacy of embodiments of the present invention to discuss in more detail embodiments of various interfaces which may be employed in conjunction with embodiments of a vehicle data system. Referring to FIGS. 12A-12D embodiments of interfaces for obtaining vehicle configuration information and the presentation of pricing data. In particular, referring first to FIG. 12A, at this point a user may have selected a 2009 Dodge Charger 4dr Sedan R/T AWD and is presented interface 1500 to allow a user to specify his desired vehicle configuration in more detail through the selection of one or more attributes. Notice that interface 1500 presents the user with both the invoice and sticker prices associated with each of the attribute which the user may select.

Once the user has selected any of the desired attributes he may be presented with an embodiment of interface 1510 such as that depicted in FIG. 12B, where the user may be allowed to select one or more currently available incentives associated with selected vehicle configuration (in this case a 2009 Dodge Charger 4dr Sedan R/T AWD). In certain embodiment, the vehicle data system may access any currently available incentives corresponding to the user's specified vehicle configuration and present interface 1510 utilizing the obtained currently available incentives to allow a user to select zero or more of the available incentives. Notice here that one of the presented incentives comprises a $4500 cash amount. Suppose for purposes of the remainder of this example that the user selects this $4500 incentive.

Figure 12A:
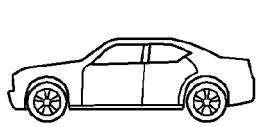
Figure 12B:
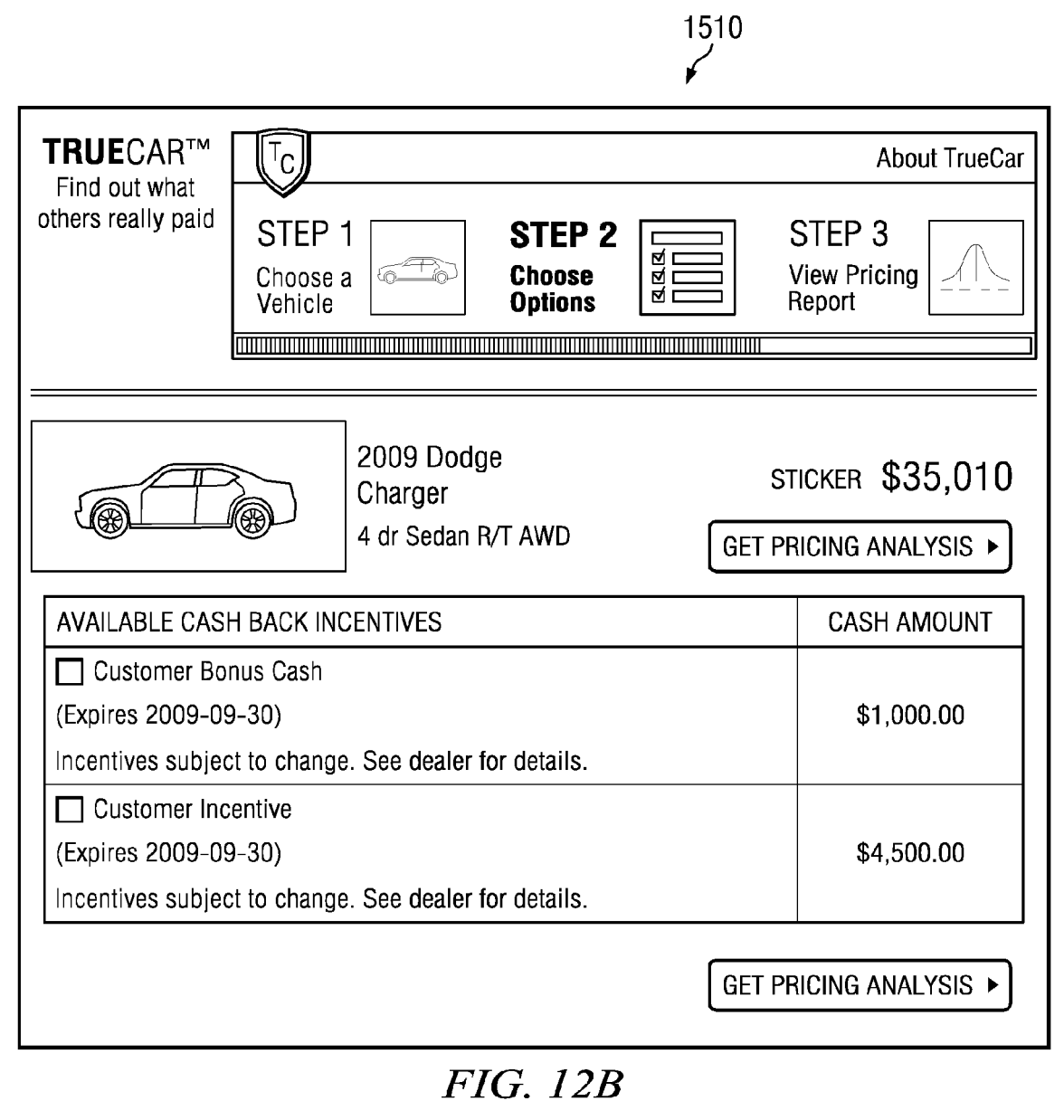
Figure 12C:
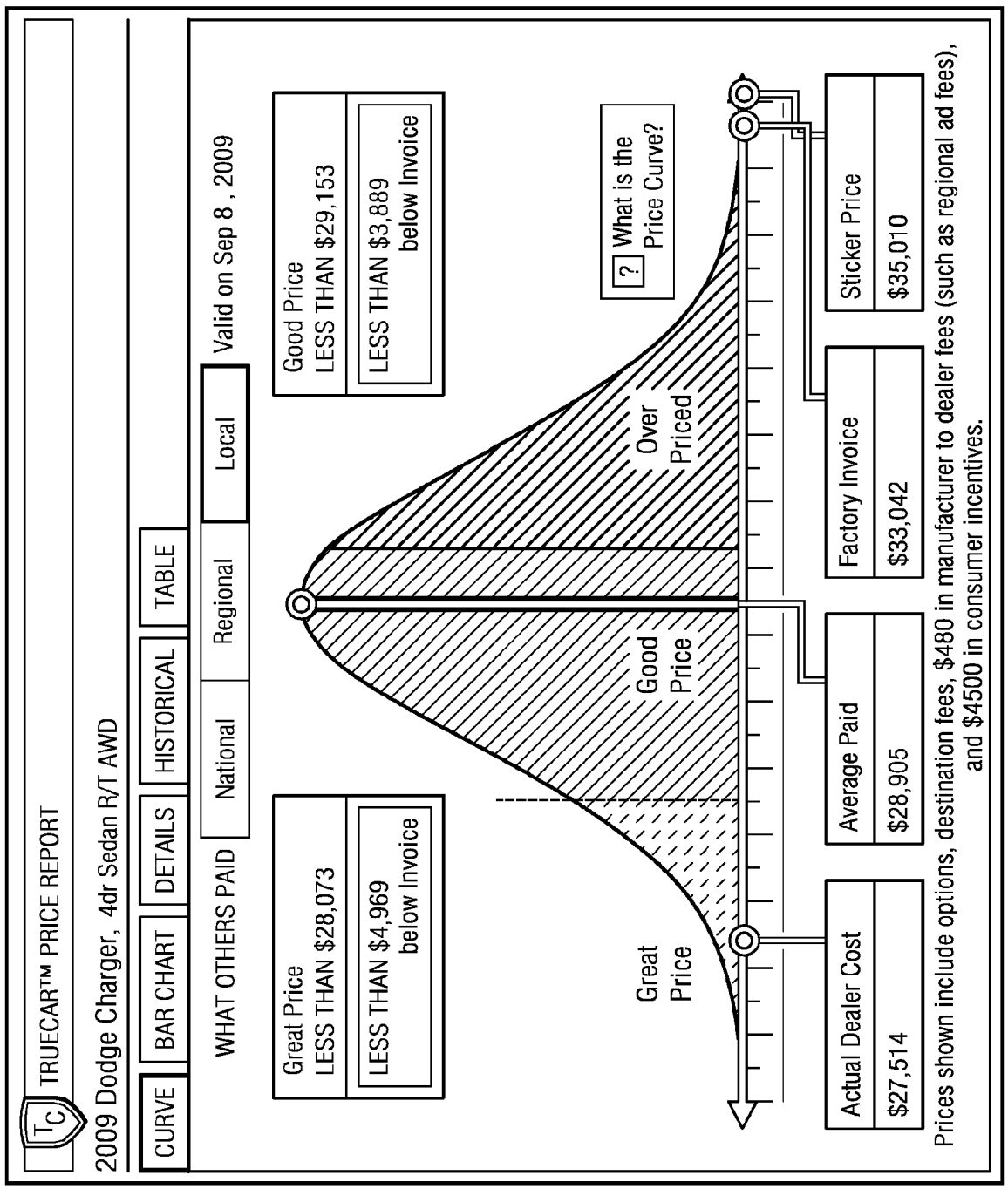

Moving now to FIG. 12C, an embodiment of an interface presenting pricing information associated with selected vehicle configuration (in this case a 2009 Dodge Charger 4dr Sedan R/T AWD) is depicted. Notice here that the interface specifically notes that the prices shown include the $4500 in consumer incentives selected by the user with respect to interface 1510 in this example.

Figure 12D:
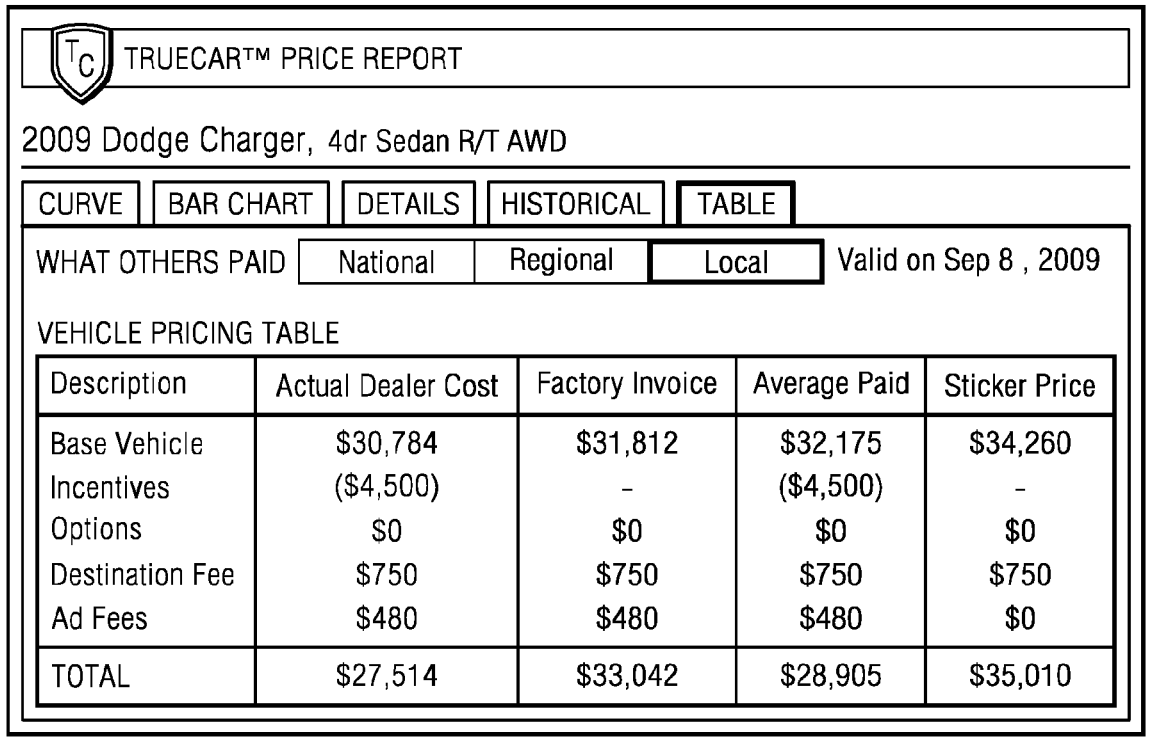

Notice now, with respect to FIG. 12D one embodiment of an interface presenting the determined Actual Dealer Cost, Factory Invoice, Average Paid (average price paid) and sticker price for a 2009 Dodge Charger 4dr Sedan R/T AWD on a local level is presented. Notice here with respect to this interface, that the user is presented not only with specific pricing points, but in addition, data on how these pricing points were determined, including how the $4500 consumer incentive selected by the user was applied to determine the dealer cost and the average price paid. By understanding incentive information and how such incentive information and other data may be pertain to the dealer cost and the average price paid by others, a user may better be able understand and evaluate prices and pricing data with respect to their desired vehicle configuration.

It may be additionally useful here to present a graphical depiction of the creation data which may be presented through such interfaces. As discussed above, a bin for a specific vehicle configuration may comprise a set of historical transaction data. From this historical transaction data, a histogram of dealer margin (transaction price−dealer cost), as well as other relevant statistics such as mean and standard deviation may be calculated. For example, FIG. 13A graphically depicts a national-level histogram for a Honda Accord corresponding to a bin with a large sample set of 6003 transactions and 18 buckets (the first bucket comprising any transaction less than 2 standard deviations from the mean, 16 buckets of 0.25 standard deviations, and the last bucket comprising any transactions greater than 2 standard deviations from the mean). FIG. 13B graphically depicts another example of a histogram for a Honda Accord.

Figure 13A:
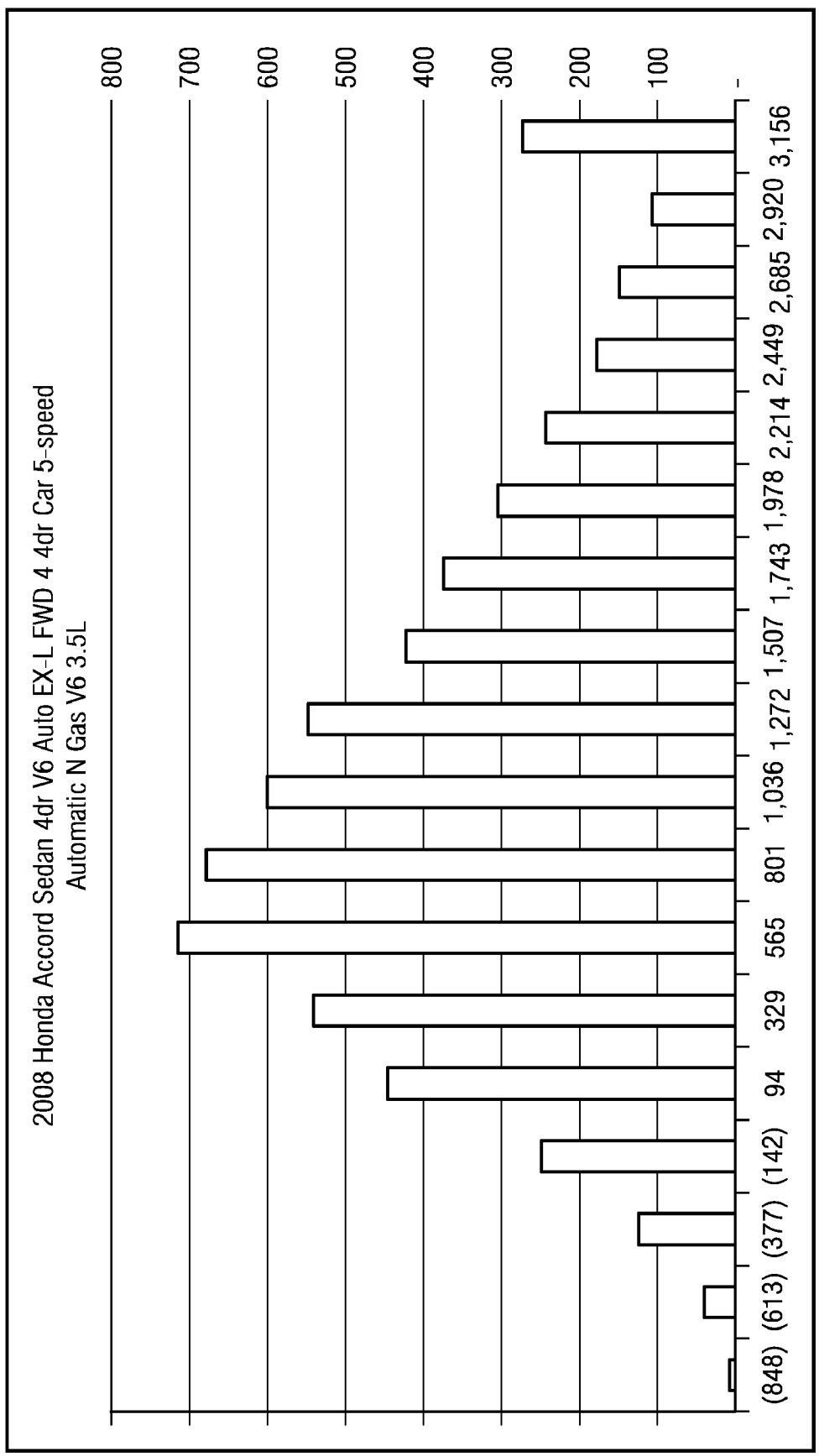
FIGS. 13-17 graphically depict the creation of pricing data.
Figure 13B:
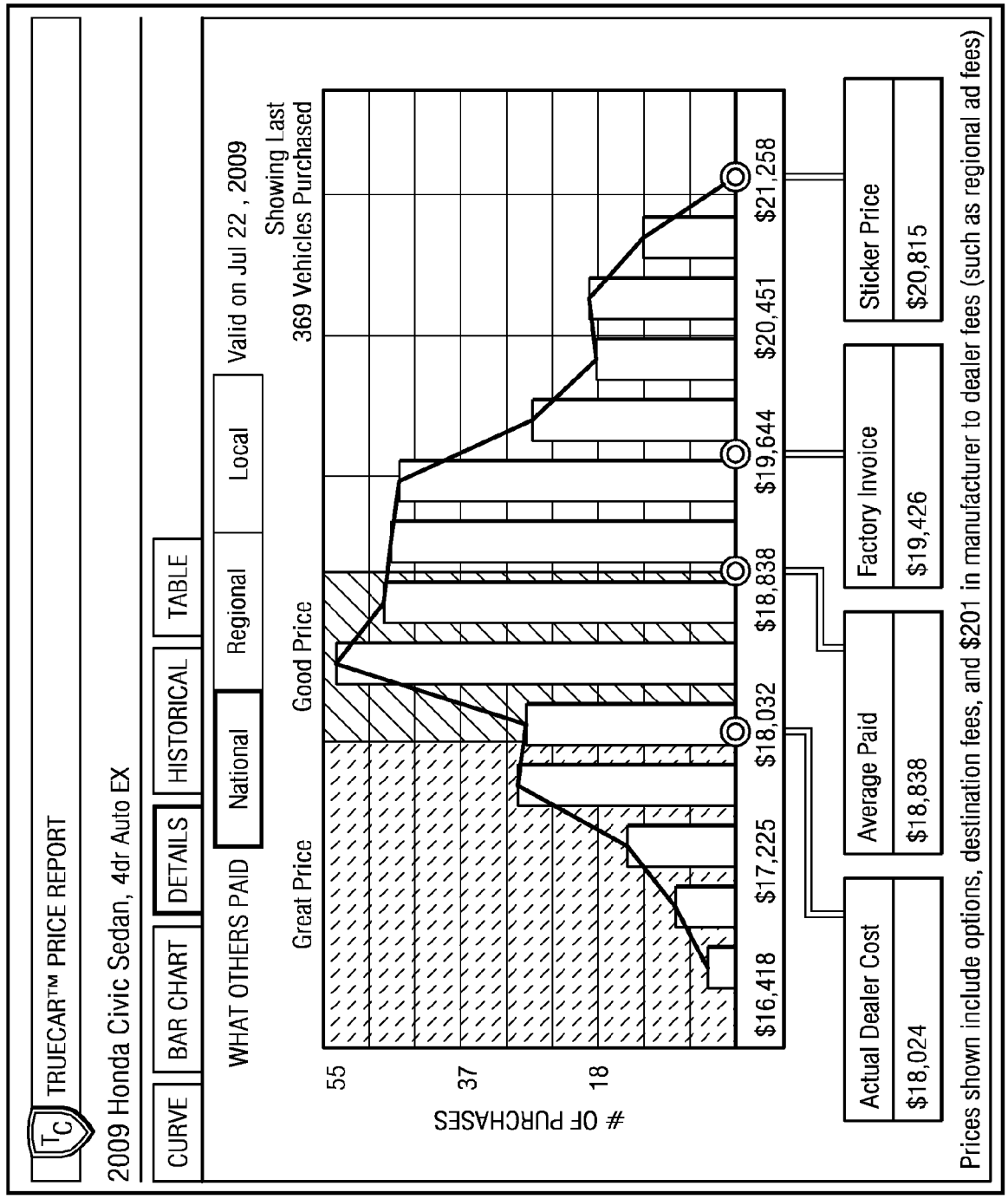
Figure 14:
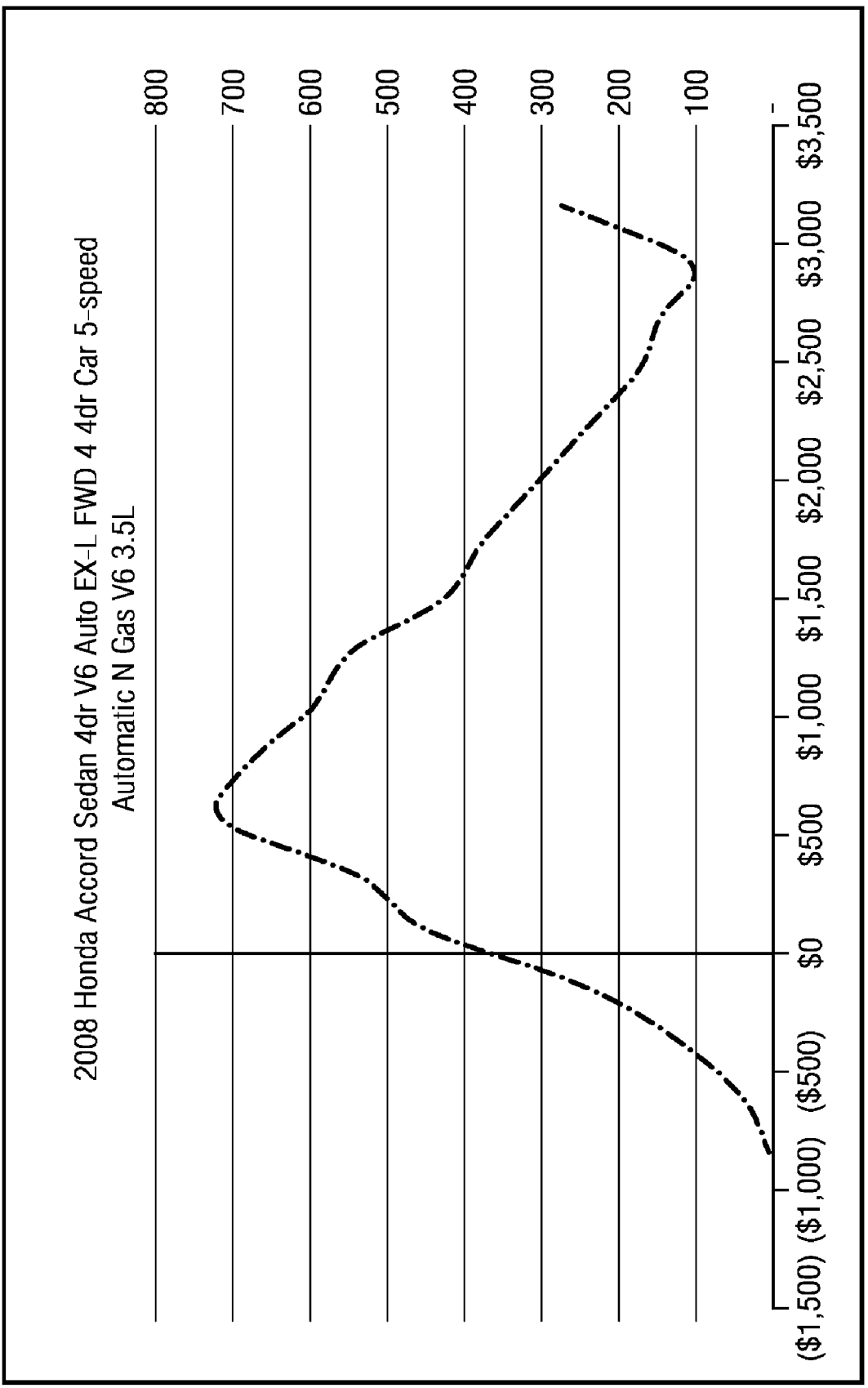
Figure 15:
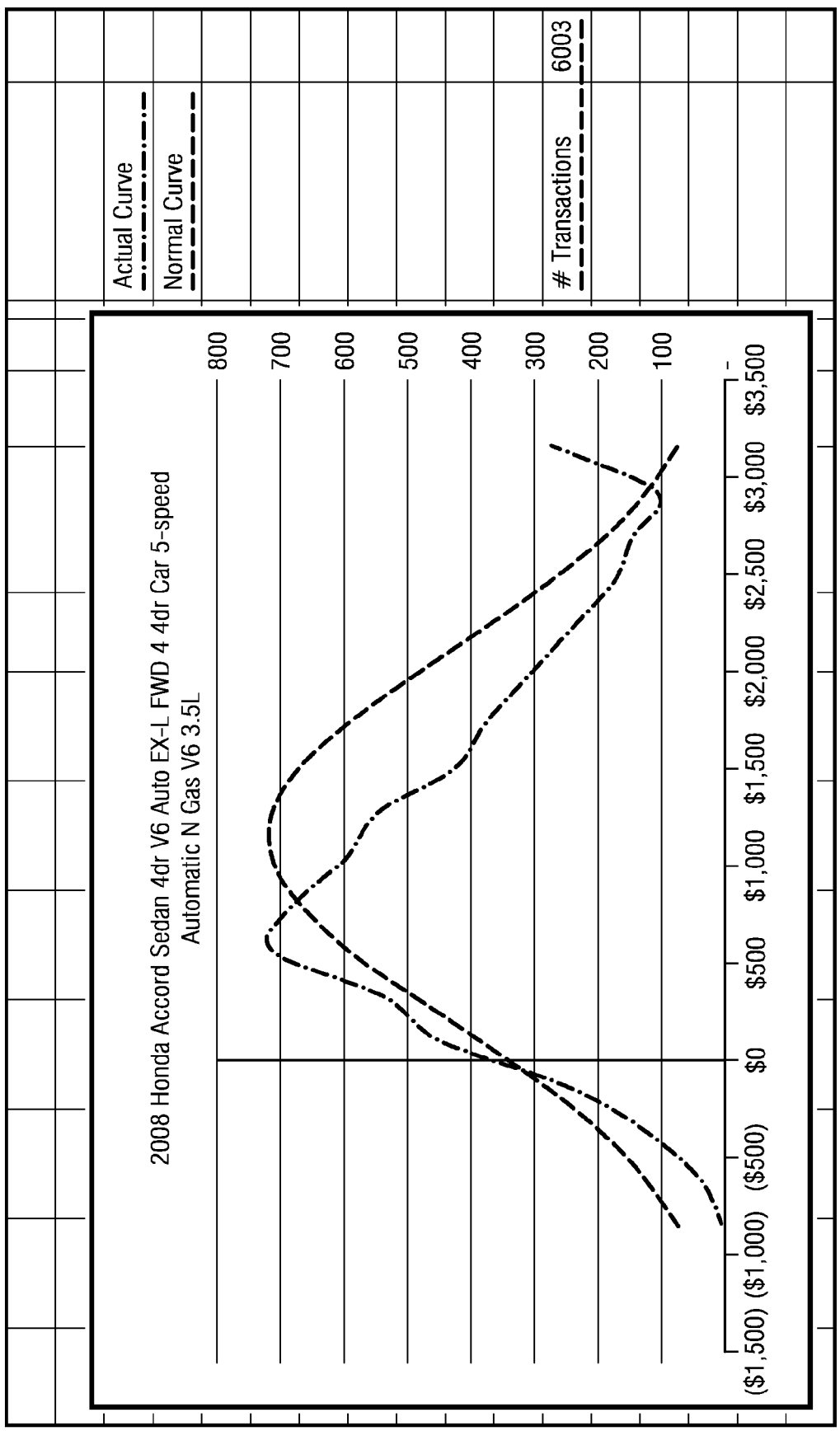

FIG. 14 depicts a conversion of the histogram of FIG. 13A into a graph. FIG. 15 graphically depicts the overlaying of the histogram curve as depicted in FIG. 14 with a normalized curve by aligning the means of the histogram and the normal curve and the values for the X-axis. Once the real curve is abstracted from a simplified normal distribution, recommended pricing ranges can then be overlaid on top of the normal curve to capture some of the complexity of the actual curve.

Figure 16:
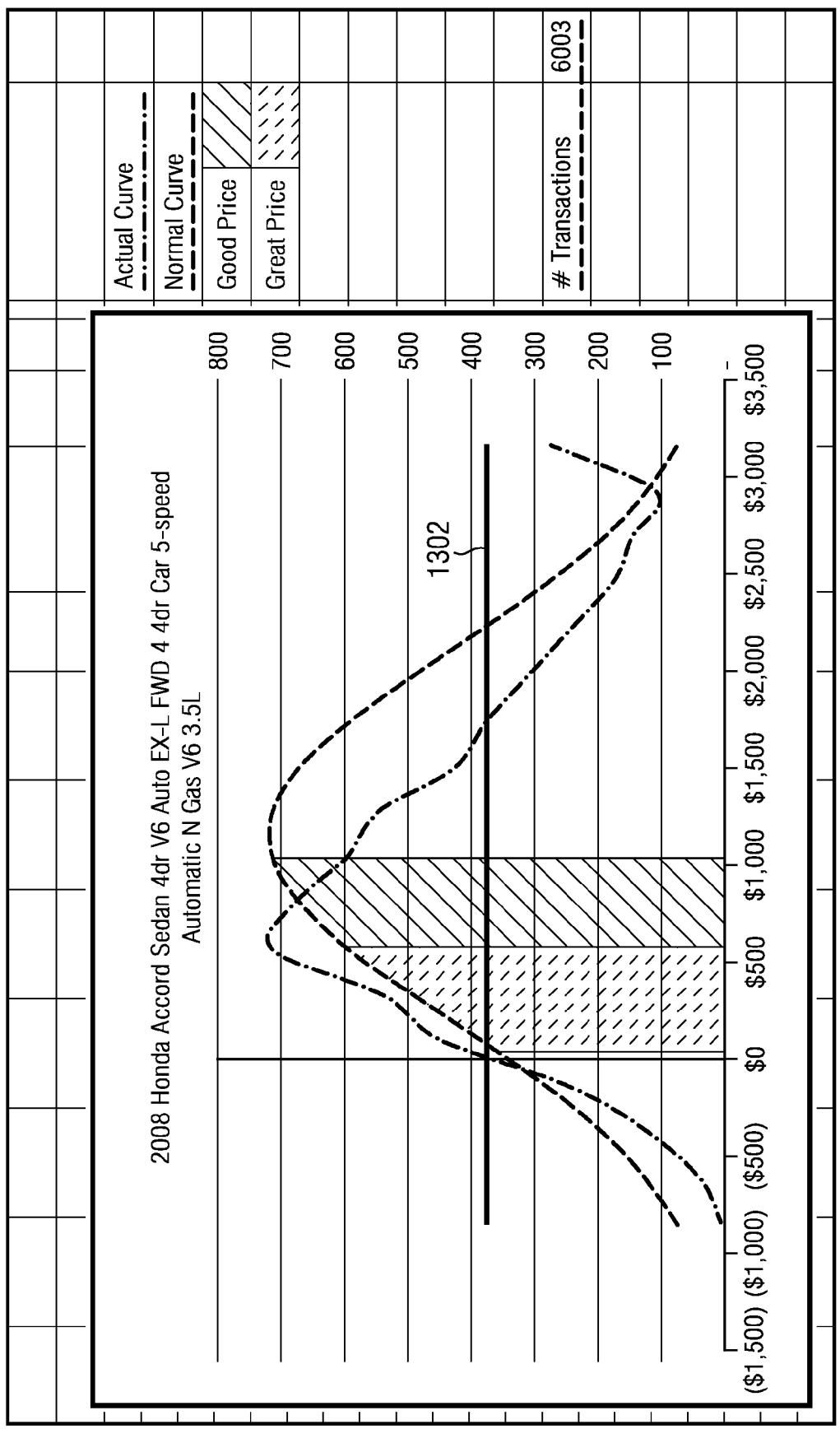

FIG. 16 graphically depicts determined "good" and "great" price ranges based on margin ranges determined based on the percentile of people that purchased the car at below that price. One algorithm could be: that the top of the range of a side of the "good" price range=MIN (50th percentile transaction margin, average margin); the lower end of the "good" range/upper end of the "great" range would be 30th percentile transaction point if less than 20% of the transactions are negative margin or 32.5th percentile transaction point if greater than 20% of the transaction are negative margin; and the lower end of "great" price range would be the 10th percentile transaction point if less than 20% of the transactions are below Dealer Cost (have a negative margin) or the 15th percentile transaction point if less than 20% of the transaction are negative margin. The entire data range could be utilized for displayed, or the range of the data may be clipped at some point of the actual data to simplify the curve. In the example depicted in FIG. 16, the data set has been clipped at the bottom of the "great" range 1302.

Figure 17:
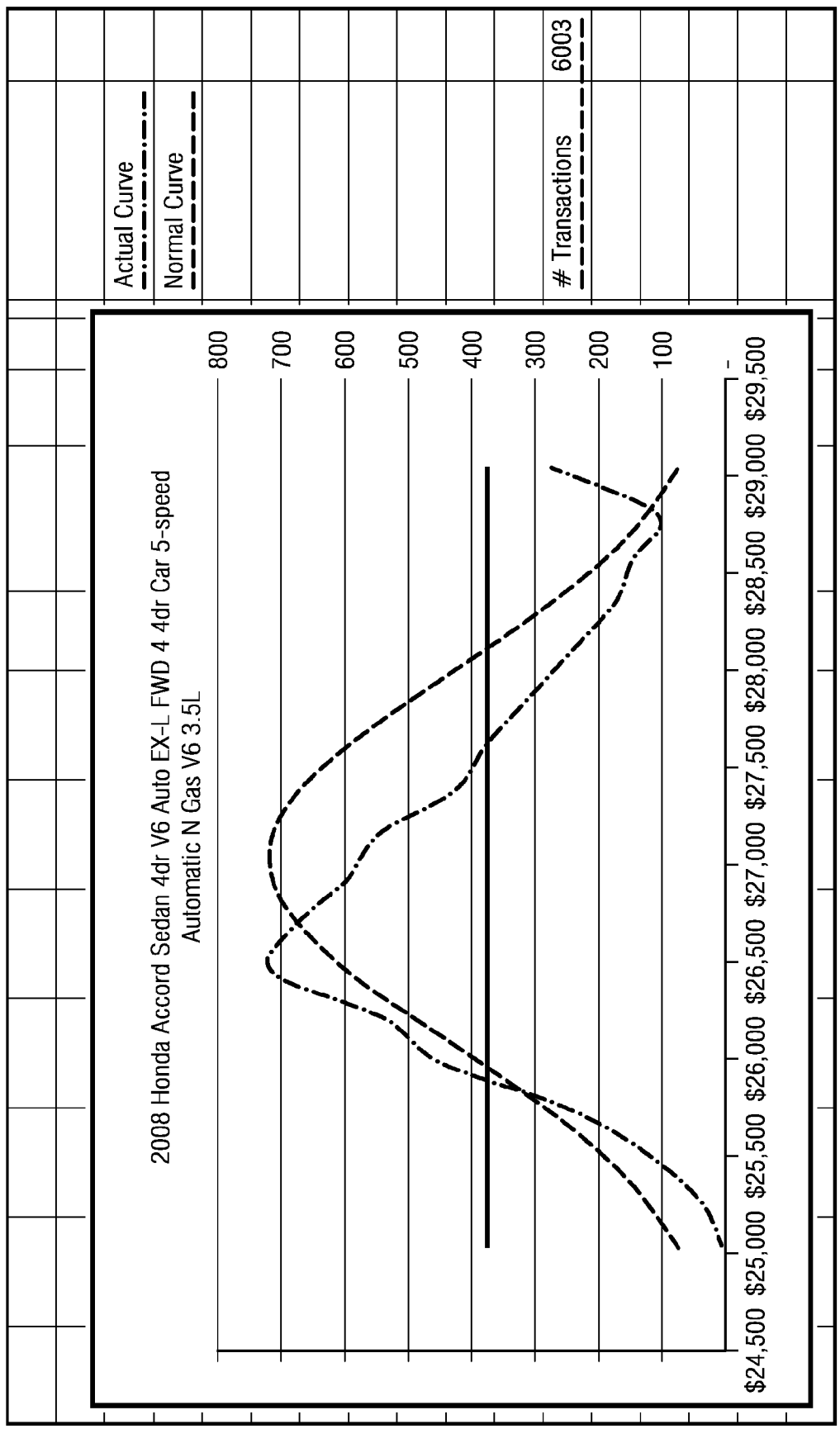
Figure 18:
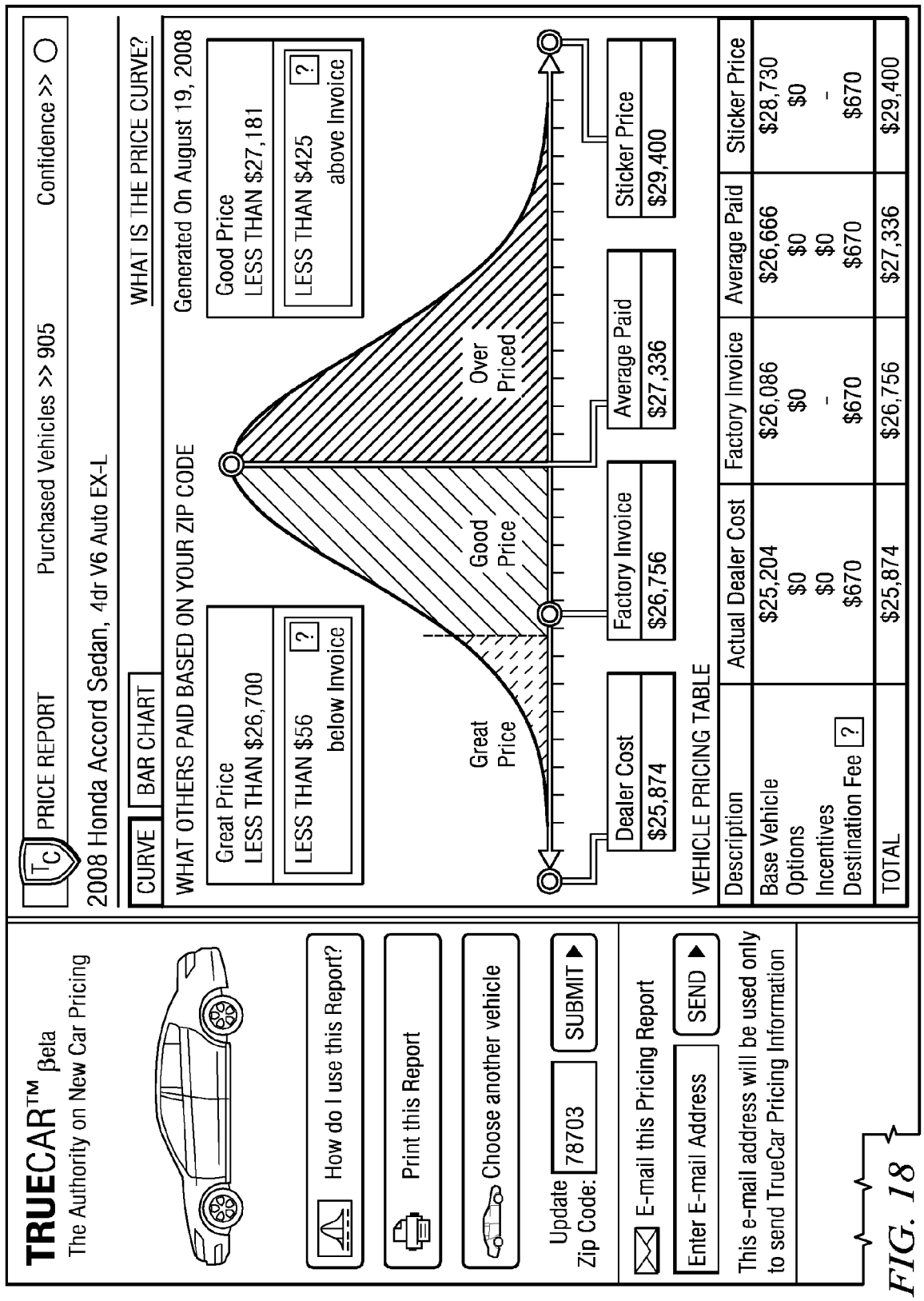
FIGS. 18-21 depict embodiments of interfaces for the presentation of pricing data.
Figure 19:
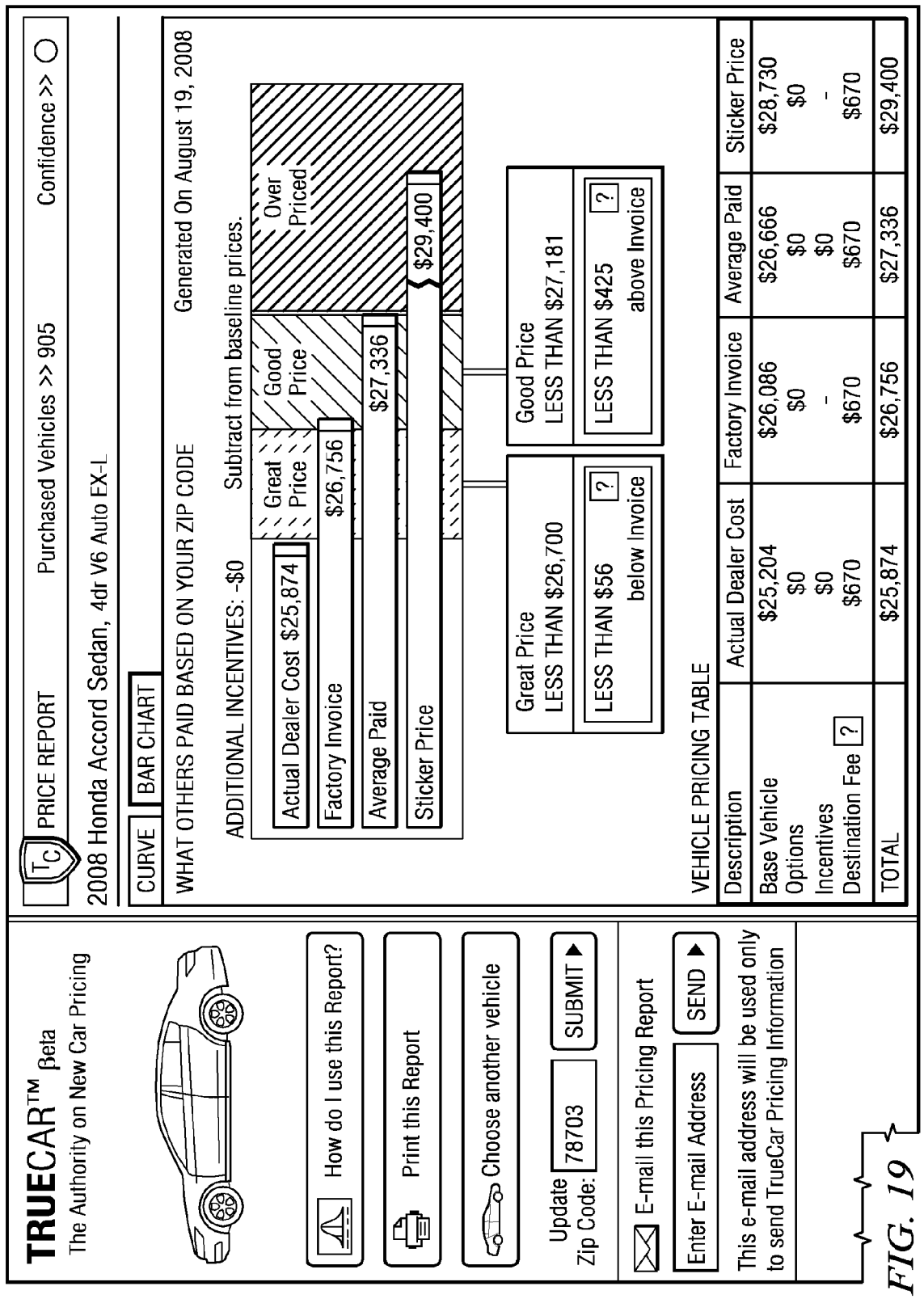
Figure 20:
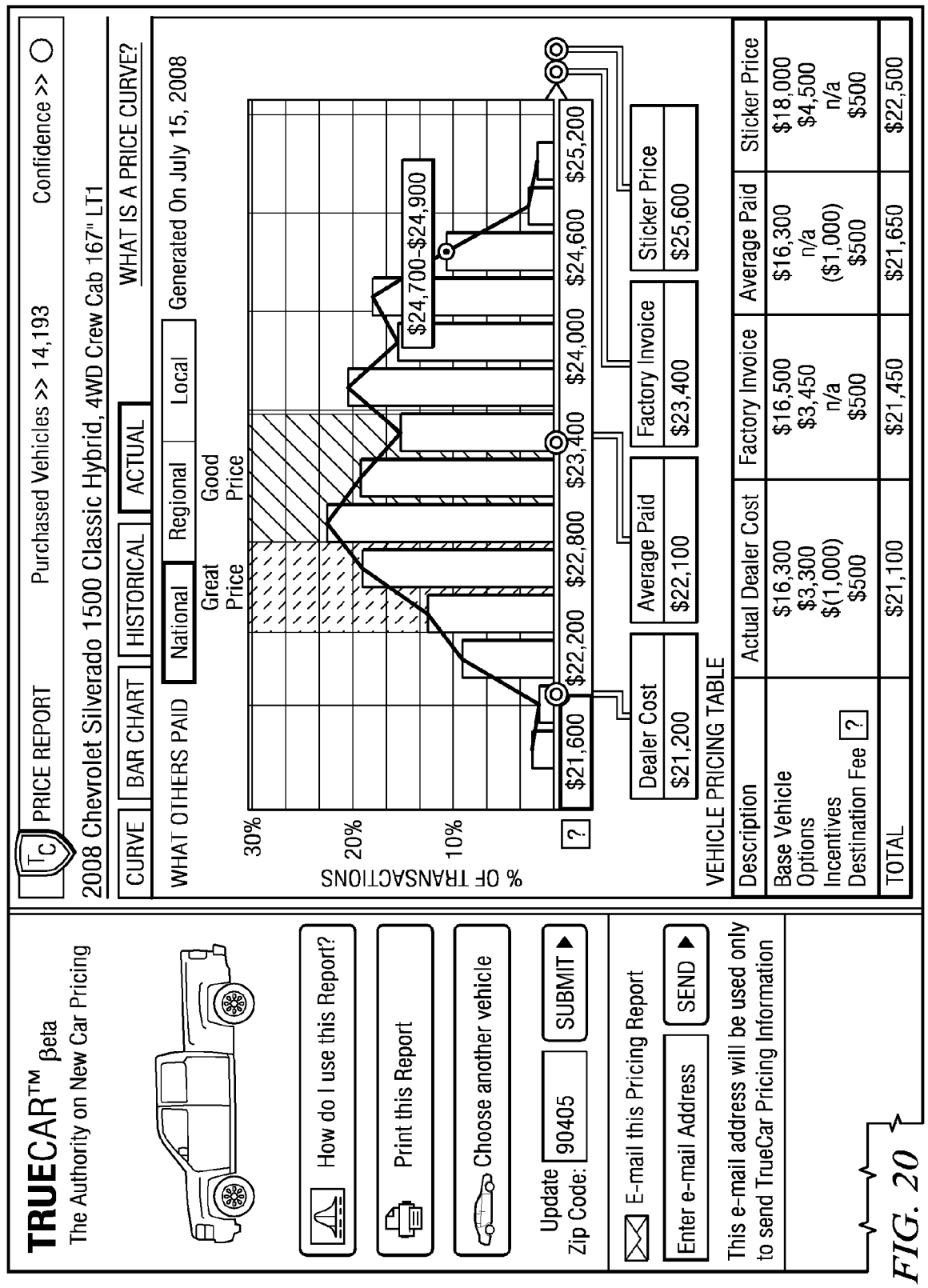
Figure 21:
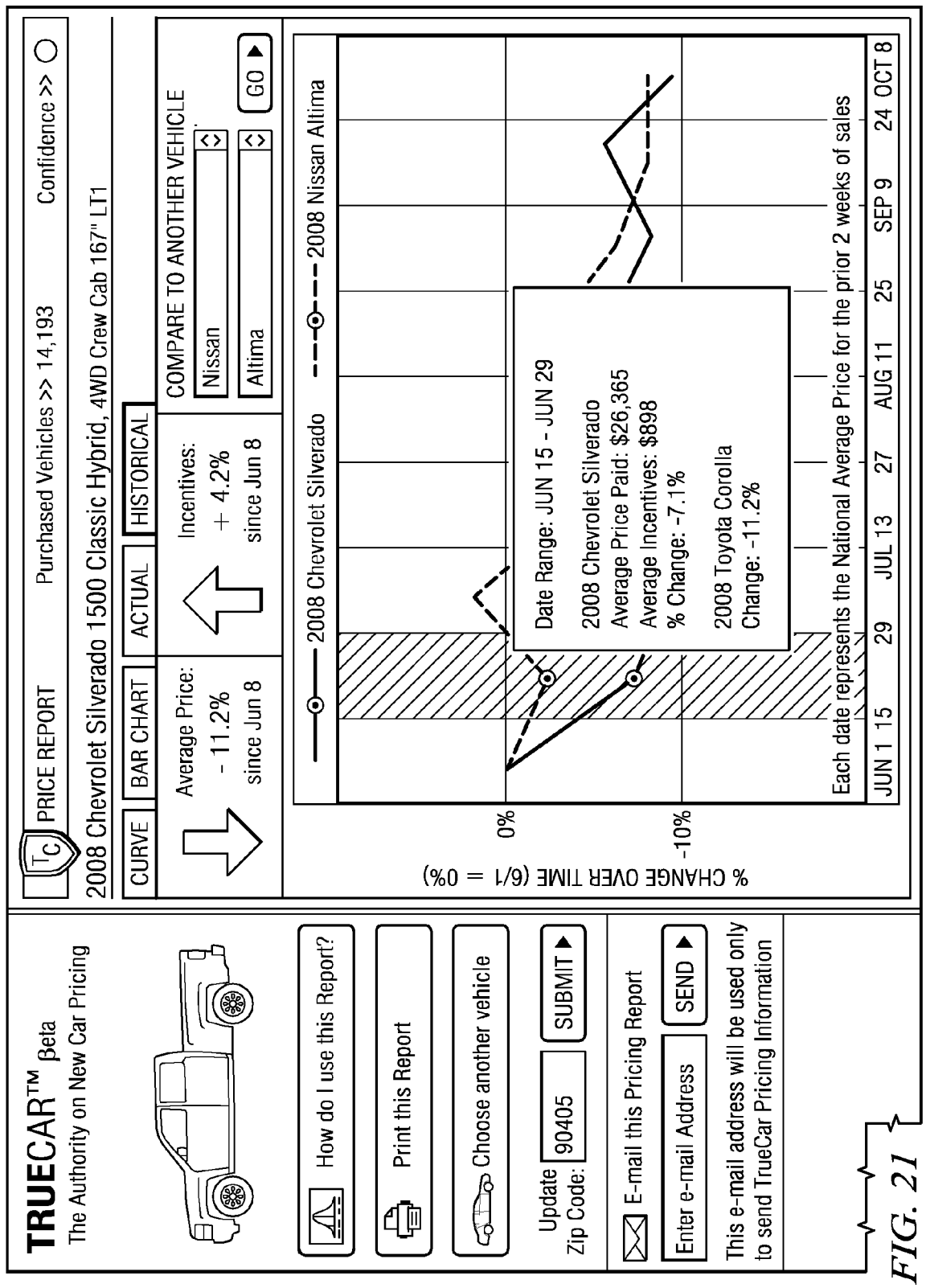

Once a dealer cost has been established for the specified vehicle, the dealer cost is added to each bucket along the X-axis of the margin histogram for this location and vehicle specification, translating the margin curve into a price curve as graphically depicted in FIG. 17. The price histogram is then overlaid with the determined "good"/"great" price ranges (which may also scaled by adding the dealer cost) as well as other pricing points of interest such as Dealer Cost, Factory Invoice, and MSRP. This enhanced histogram may be presented to user in a variety of formats, for example, the histogram may be displayed as a simplified curve as depicted in FIG. 18; as a bar chart as depicted in FIG. 19; as actual data as depicted in FIG. 20; or as historical trend data as in depicted in FIG. 21.

As mentioned above, to determine accurate pricing information for a specified vehicle, it is important to have accurate cost information associated with the historical transaction data associated with that vehicle. Thus, in many cases when obtaining historical transaction data from a data source it may be desired to check a dealer cost provided in conjunction with a historical transaction or to determine a dealer cost to associate with the historical transaction. As dealer cost models have been constructed for each manufacturer (see step 520) it may be possible to leverage these dealer cost models to accurately construct dealer cost for one or more historical transactions and check a provided dealer cost or associate the determine dealer cost with a historical transaction.

Figure 22:
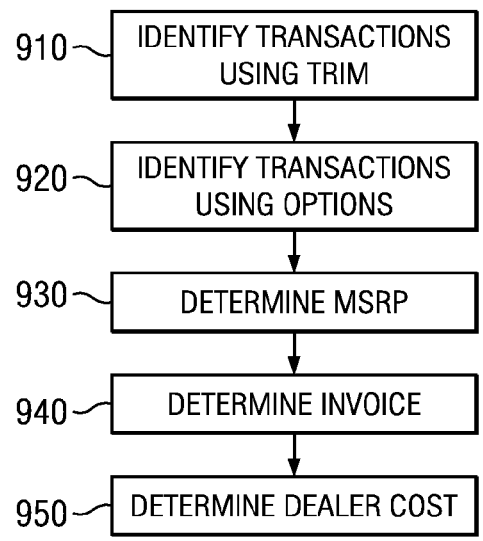
FIG. 22 depicts one embodiment of a method for determining dealer cost.

FIG. 22 depicts one embodiment of a method for determining an accurate dealer cost for historical transactions. Initially, at step 910 historical transactions of obtained historical data which have accurate trim mapping may be identified. In most cases, the vehicle associated with a historical transactions may be mapped to a particular trim based on the vehicle identification number (VIN) associated with the historical transaction. However, often a 1 to 1 VIN mapping cannot be completed as all information necessary to perform the mapping might not be included in the VIN. In other words, a particular VIN may correspond to many trim levels for a vehicle. In these cases data providers may provide a one-to-many mapping and provide multiple trims associated with a single historical transaction. This presents a problem, as an actual sales transaction may then have multiple historical transactions in the historical transaction data, each historical transaction associated with a different trim, only one of which is actually correct. Given that there is often no way of identifying which of these historical transactions is correct, an appropriate modeling approach is to either weight these transactions differently or exclude these potential mismapped transactions from the model-building dataset. Thus, in one embodiment, after identifying these potential mismapped transactions by for example, determining if there are multiple historical transactions associated with a single VIN, the identified historical transactions may be excluded from the historical data set (for purposes of this method).

Within the remaining historical transactions, then, those historical transactions with accurate information may be identified at step 920. As discussed before, the invoice and dealer cost fields of historical transaction data may be inaccurate. As one objective of the determination of dealer cost is accuracy it is important that dealer cost be determined only for those historical transactions where it can be determined with relative accuracy. As the presence of accurate trim information or option information may be leveraged to determine dealer cost, it may be desired to further refine the historical transaction to determine those historical transactions with accurate trim mapping or identifiable options information.

Now that a set of historical transactions with accurate trim mapping and identifiable option information has been obtained, an MSRP may be determined for each of these historical transactions at step 930. Again, given that the data associated with a historical transaction may be unreliable and that alignment with configuration data (for example, dealer cost models or price ratio equation) is important, it may be desirable to determine certain data associated with the historical transaction data utilizing known data. Thus, even if an MSRP was provided or otherwise obtained, an MSRP for the historical transaction may be determined. First, a base MSRP may be determined. Specifically, with year, make, model, and trim identified specifically from the VIN, a base MSRP may be determined based on data provided by a data source. Then, using additional options identified by the historical transaction data the manufacturer suggested retail pricing for these options can be added to the base MSRP to form the transaction MSRP. More specifically, with each historical transaction there may be a field that includes a set of options codes indicating which options were factory-installed on the particular vehicle corresponding to that historical transaction. Parsing this information, the options codes can be used in conjunction with option pricing information obtained from a data source to identify a MSRP for each factory-installed option. Summing each of the manufacturer prices for the options the Total Options MSRP can be generated and added to the base MSRP to generate the transaction MSRP for that particular historical transaction (Transaction MSRP=Base MSRP+Total Options MSRP).

After the transaction MSRP is determined for the historical transactions, invoice pricing for each of the historical transactions may be determined at step 940. The transaction invoice may be generated similarly to the transaction MSRP. First, a base Invoice price may be determined. Specifically, with year, make, model, and trim identified specifically from the VIN, a base Invoice price may be determined based on data provided by a data source. Then, using additional options identified by the historical transaction data, pricing for these options can be added to the base Invoice price to form the transaction Invoice price. More specifically, with each historical transaction there may be a field that includes a set of options codes indicating which options were factory-installed on the particular vehicle corresponding to that historical transaction. Parsing this information, the options codes can be used in conjunction with option pricing information to assign an options Invoice price for each factory-installed option. Summing each of the option Invoice prices for the options the Total Options Invoice price can be generated and added to the base Invoice price to generate the transaction Invoice price for that particular historical transaction (Transaction Invoice=Base Invoice+Total Options Invoice).

Using the determined MSRPs and Invoice prices, a dealer cost for each historical transaction may be determined at step 950. This dealer cost may be determined by algorithmically determined utilizing the dealer cost model associated with the manufacturer of the vehicle associated with a historical transaction. More specifically, each make of vehicle (manufacturer) has an associated holdback equation as discussed above. For a particular historical transaction, using the holdback equation corresponding to the make of the vehicle to which the historical transaction pertains, the base invoice price, base MSRP, transaction invoice price and transaction MSRP determined for that historical transaction, and freight fees (which may be determined based on information obtained from a data source similarly to the determination of base invoice and base MSRP), the holdback equation can be applied to determine dealer cost (dealercost=invoice−holdback).

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention. Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system, comprising:
a vehicle data system coupled to one or more computer devices over a network, the vehicle data system comprising:
a processor; and
a non-transitory computer readable memory, comprising instructions for:
a processing module, the processing module configured to:
determine a plurality of sets of the historical transaction data, where each of the plurality of sets of historical transaction data is associated with a vehicle configuration, and the sets of historical transaction data comprise data on vehicle transactions and
determine pricing data corresponding to a specified vehicle configuration wherein the pricing data includes a set of transaction prices and one or more price ranges determined based on the set of historical transaction data associated with the specified vehicle configuration;
a sales generation module, the sale generation module configured to:
determine an upfront price corresponding to the specified vehicle configuration, wherein the upfront price is offered by a dealer; and
an interface module configured to:
receive the specified vehicle configuration from a user at a computing device, and
generate an interface based on the pricing data and provide the interface to the one or more computer devices over the network, wherein the interface is configured to present the set of transaction prices, the one or more price ranges and the upfront price in conjunction with one another.

2. The system of claim 1, wherein the upfront price is presented relative to the set of transaction prices and the price ranges.

3. The system of claim 2, wherein the set of transaction prices are presented as a curve and the price ranges and upfront price are presented in relation to the curve.

4. The system of claim 2, wherein the interface presents the user an opportunity to initiate a purchase associated with the specified vehicle configuration.

5. The system of claim 4, wherein the opportunity is presented in conjunction with the upfront price.

6. The system of claim 5, wherein the user initiates the purchase by providing personal information using the interface.

7. The system of claim 1, wherein the processing module is on a processing computer, the sales generation module is on a sales generation computer and the interface module is on an interface computer.

8. The system of claim 7, wherein the processing computer, the sale generation computer and the interface computer are the same.

9. A method, comprising:
determining, at a processing computer, a plurality of sets of historical transaction data, where each of the plurality of sets of historical transaction data is associated with a vehicle configuration and the sets of historical transaction data comprise data on vehicle transactions;
receiving over a network, at the processing computer, a specified vehicle configuration from a user at a computing device;
determining, at the processing computer, pricing data corresponding to a specified vehicle configuration wherein the pricing data includes a set of transaction prices and one or more price ranges determined based on the set of historical transaction data associated with the specified vehicle configuration;
determining, at the processing computer, an upfront price offered by a dealer corresponding to the specified vehicle configuration and a dealer; and
generating, at an interface computer, an interface based on the pricing data and providing the interface to the computer devices over the network, wherein the interface is configured to present the set of transaction prices, the one or more price ranges and the upfront price in conjunction with one another.

10. The method of claim 9, wherein the upfront price is presented relative to the set of transaction prices and the price ranges.

11. The method of claim 10, wherein the set of transaction prices are presented as a curve and the price ranges and upfront price are presented in relation to the curve.

12. The method of claim 11, wherein the opportunity is presented in conjunction with the upfront price.

13. The method of claim 12, wherein the user initiates the purchase by providing personal information using the interface.

14. The method of claim 10, wherein the interface presents the user an opportunity to initiate a purchase associated with the specified vehicle configuration.

15. The method of claim 9, wherein the processing computer, the sale generation computer and the interface computer are the same.

16. A non-transitory computer readable media, comprising computer instructions executable by a processor for:
   determining a plurality of sets of historical transaction data, where each of the plurality of sets of historical transaction data is associated with a vehicle configuration and the sets of historical transaction data comprise data on vehicle transactions;
   receiving a specified vehicle configuration from a user at a computing device;
   determining pricing data corresponding to a specified vehicle configuration wherein the pricing data includes a set of transaction prices and one or more price ranges determined based on the set of historical transaction data associated with the specified vehicle configuration;
   determining an upfront price offered by a dealer corresponding to the specified vehicle configuration and a dealer; and
   generating an interface based on the pricing data and providing the interface to the computer devices over the network, wherein the interface is configured to present the set of transaction prices, the one or more price ranges and the upfront price in conjunction with one another.

17. The computer readable medium of claim 16, wherein the upfront price is presented relative to the set of transaction prices and the price ranges.

18. The method of claim 17, wherein the set of transaction prices are presented as a curve and the price ranges and upfront price are presented in relation to the curve.

19. The method of claim 18, wherein the opportunity is presented in conjunction with the upfront price.

20. The method of claim 19, wherein the user initiates the purchase by providing personal information using the interface.

21. The method of claim 17, wherein the interface presents the user an opportunity to initiate a purchase associated with the specified vehicle configuration.

22. The method of claim 16, wherein the processing computer, the sale generation computer and the interface computer are the same.

* * * * *

UNITED STATES PATENT AND TRADEMARK OFFICE
CERTIFICATE OF CORRECTION

PATENT NO. : 8,219,464 B2
APPLICATION NO. : 13/080832
DATED : July 10, 2012
INVENTOR(S) : Philip Inghelbrecht and Scott Painter It is certified that error appears in the above-identified patent and that said Letters Patent is hereby corrected as shown below:

In the Claims:

Col. 39, line 15, claim 16, replace "media" with --medium--

Col. 40, line 9, claim 17, insert --non-transitory-- between "The" and "computer"

Col. 40, line 12, claim 18, replace "method" with --non-transitory computer readable medium--

Col. 40, line 15, claim 19, replace "method" with --non-transitory computer readable medium--

Col. 40, line 17, claim 20, replace "method" with --non-transitory computer readable medium--

Col. 40, line 20, claim 21, replace "method" with --non-transitory computer readable medium--

Col. 40, line 23, claim 22, replace "method" with --non-transitory computer readable medium--

Signed and Sealed this
Third Day of September, 2013

Teresa Stanek Rea
*Acting Director of the United States Patent and Trademark Office*